(12) United States Patent
Ishii et al.

(10) Patent No.: US 10,776,278 B2
(45) Date of Patent: Sep. 15, 2020

(54) STORAGE CONTROL APPARATUS AND COMPUTER-READABLE STORAGE MEDIUM STORING STORAGE CONTROL PROGRAM

(71) Applicant: FUJITSU LIMITED, Kawasaki-shi, Kanagawa (JP)

(72) Inventors: Takanori Ishii, Nerima (JP); Tomoka Aoki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 155 days.

(21) Appl. No.: 16/026,174

(22) Filed: Jul. 3, 2018

(65) Prior Publication Data

US 2019/0018784 A1 Jan. 17, 2019

(30) Foreign Application Priority Data

Jul. 11, 2017 (JP) .................... 2017-135335

(51) Int. Cl.
*G06F 12/00* (2006.01)
*G06F 12/10* (2016.01)
*G06F 12/02* (2006.01)

(52) U.S. Cl.
CPC .......... *G06F 12/10* (2013.01); *G06F 12/0246* (2013.01); *G06F 12/0253* (2013.01); *G06F 2212/1016* (2013.01); *G06F 2212/1036* (2013.01); *G06F 2212/1044* (2013.01); *G06F 2212/222* (2013.01); *G06F 2212/466* (2013.01); *G06F 2212/7201* (2013.01); *G06F 2212/7205* (2013.01)

(58) Field of Classification Search
CPC .......... G06F 12/2053; G06F 12/0253
See application file for complete search history.

(56) References Cited

U.S. PATENT DOCUMENTS

| | | |
|---|---|---|
| 2007/0101047 A1 | 5/2007 | Kamiya et al. |
| 2014/0289449 A1 | 9/2014 | Ogata |
| 2016/0170903 A1 | 6/2016 | Kanno et al. |

FOREIGN PATENT DOCUMENTS

| | | |
|---|---|---|
| JP | 2016-115355 | 6/2016 |
| WO | 2006/067839 | 6/2006 |
| WO | 2014/049678 | 4/2014 |

OTHER PUBLICATIONS

J-PlatPat English Abstract for Japanese Patent Application Publication No. 2016-115355, published Jun. 23, 2016.

*Primary Examiner* — Daniel D Tsui
(74) *Attorney, Agent, or Firm* — Staas & Halsey LLP

(57) ABSTRACT

A storing unit stores therein mapping management information indicating mappings between each of a plurality of divided regions created by dividing logical storage space on a storage apparatus and one of a plurality of identification numbers each representing a different write frequency. A control unit measures the write frequency of each of the plurality of divided regions and updates the mappings indicated by the mapping management information based on results of the write frequency measurement. Upon request for a data write to a write address included in a divided region after the update of the mappings, the control unit identifies an identification number associated with the divided region based on the mapping management information, appends the identified identification number to a write request for the write address, and transmits the write request with the identified identification number appended thereto to the storage apparatus.

12 Claims, 22 Drawing Sheets

FIG. 5
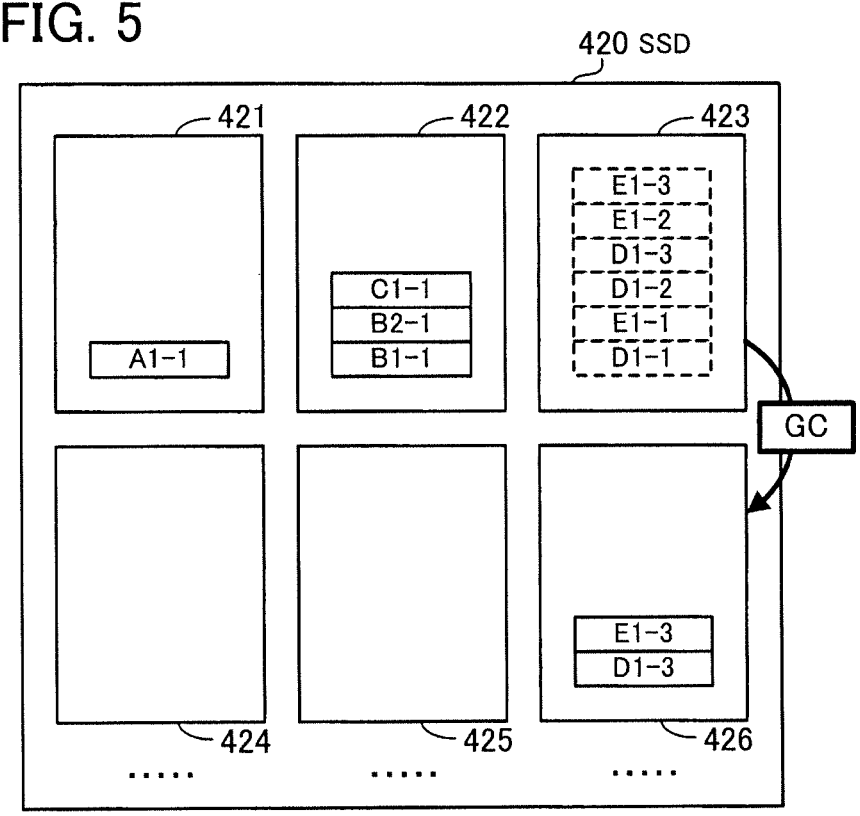
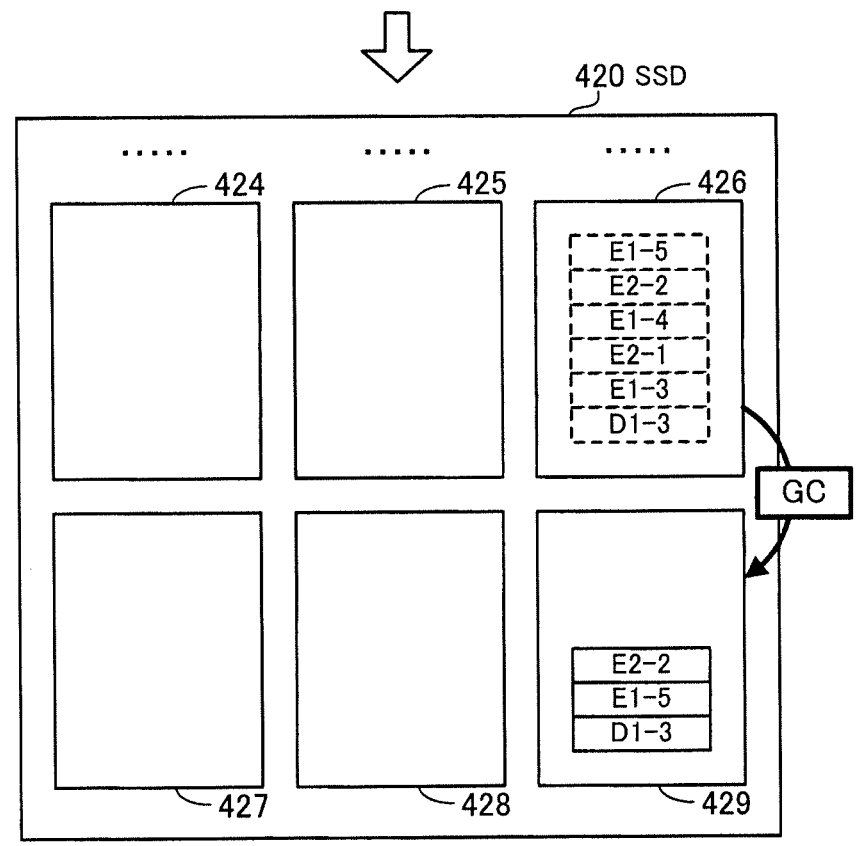

FIG. 14

111 STREAM ID MANAGEMENT TABLE

| UNIT REGION ID | WRITE DATA AMOUNT | WRITE COUNT | STREAM ID | GC IMPLEMENTATION FLAG | ID STATUS |
|---|---|---|---|---|---|
| a | 6 GB | 60 | 0 | UNIMPLEMENTED | CURRENT ID |
| b | 14 GB | 140 | 0 | UNIMPLEMENTED | CURRENT ID |
| c | 80 GB | 800 | 0 | UNIMPLEMENTED | CURRENT ID |

112 WRITE AMOUNT MANAGEMENT TABLE

| STREAM ID | WRITE DATA AMOUNT |
|---|---|
| 0 | 100 GB |

113 SSD WRITE AMOUNT MANAGEMENT TABLE

| SSD ID | WRITE DATA INCREMENT |
|---|---|
| 1 | 100 GB |

FIG. 16

111 STREAM ID MANAGEMENT TABLE

| UNIT REGION ID | WRITE DATA AMOUNT | WRITE COUNT | STREAM ID | GC IMPLEMENTATION FLAG | ID STATUS |
|---|---|---|---|---|---|
| a | 0 | 0 | 1 | UNIMPLEMENTED | CURRENT ID |
| b | 0 | 0 | 2 | UNIMPLEMENTED | CURRENT ID |
| c | 0 | 0 | 3 | UNIMPLEMENTED | CURRENT ID |
| a | 6 GB | N/A | 0 | UNIMPLEMENTED | FORMER ID |
| b | 14 GB | N/A | 0 | UNIMPLEMENTED | FORMER ID |
| c | 80 GB | N/A | 0 | UNIMPLEMENTED | FORMER ID |

111a, 111b, 111c, 111d, 111e, 111f

112 WRITE AMOUNT MANAGEMENT TABLE

| STREAM ID | WRITE DATA AMOUNT |
|---|---|
| 0 | 100 GB |

113 SSD WRITE AMOUNT MANAGEMENT TABLE

| SSD ID | WRITE DATA INCREMENT |
|---|---|
| 1 | 0 GB |

FIG. 17

111 STREAM ID MANAGEMENT TABLE

| UNIT REGION ID | WRITE DATA AMOUNT | WRITE COUNT | STREAM ID | GC IMPLEMENTA- TION FLAG | ID STATUS |
|---|---|---|---|---|---|
| c | 80 GB | 0 | 3 | UNIMPLEMENTED | CURRENT ID |
| d | 40 GB | 0 | 3 | UNIMPLEMENTED | CURRENT ID |
| b | 20 GB | 0 | 2 | UNIMPLEMENTED | CURRENT ID |
| e | 30 GB | 0 | 2 | UNIMPLEMENTED | CURRENT ID |
| a | 0 | 0 | 1 | UNIMPLEMENTED | CURRENT ID |
| a | 6 GB | N/A | 0 | UNIMPLEMENTED | FORMER ID |
| b | 14 GB | N/A | 0 | UNIMPLEMENTED | FORMER ID |
| c | 80 GB | N/A | 0 | UNIMPLEMENTED | FORMER ID |
| d | 30 GB | N/A | 0 | UNIMPLEMENTED | FORMER ID |
| e | 10 GB | N/A | 0 | UNIMPLEMENTED | FORMER ID |

111g, 111h, 111i, 111j, 111k, 111l, 111m, 111n, 111o, 111p

112 WRITE AMOUNT MANAGEMENT TABLE

| STREAM ID | WRITE DATA AMOUNT |
|---|---|
| 0 | 140 GB |
| 1 | 0 |
| 2 | 50 GB |
| 3 | 120 GB |

113 SSD WRITE AMOUNT MANAGEMENT TABLE

| SSD ID | WRITE DATA INCREMENT |
|---|---|
| 1 | 0 |

FIG. 18

111 STREAM ID MANAGEMENT TABLE

| UNIT REGION ID | WRITE DATA AMOUNT | WRITE COUNT | STREAM ID | GC IMPLEMENTA-TION FLAG | ID STATUS |
|---|---|---|---|---|---|
| c | 20 GB | 0 | 3 | IMPLEMENTED | CURRENT ID |
| d | 10 GB | 0 | 3 | IMPLEMENTED | CURRENT ID |
| b | 20 GB | 0 | 2 | UNIMPLEMENTED | CURRENT ID |
| e | 30 GB | 0 | 2 | UNIMPLEMENTED | CURRENT ID |
| a | 0 | 0 | 1 | IMPLEMENTED | CURRENT ID |
| a | 5 GB | N/A | 0 | IMPLEMENTED | FORMER ID |
| b | 0 | N/A | 0 | IMPLEMENTED | FORMER ID |
| c | 0 | N/A | 0 | IMPLEMENTED | FORMER ID |
| d | 0 | N/A | 0 | IMPLEMENTED | FORMER ID |
| e | 0 | N/A | 0 | IMPLEMENTED | FORMER ID |

112 WRITE AMOUNT MANAGEMENT TABLE

| STREAM ID | WRITE DATA AMOUNT |
|---|---|
| 0 | 5 GB |
| 1 | 0 |
| 2 | 50 GB |
| 3 | 30 GB |

113 SSD WRITE AMOUNT MANAGEMENT TABLE

| SSD ID | WRITE DATA INCREMENT |
|---|---|
| 1 | 0 |

FIG. 20

111 STREAM ID MANAGEMENT TABLE

| UNIT REGION ID | WRITE DATA AMOUNT | WRITE COUNT | STREAM ID | GC IMPLEMENTATION FLAG | ID STATUS |
|---|---|---|---|---|---|
| c | 20 GB | 0 | 3 | IMPLEMENTED | CURRENT ID |
| d | 10 GB | 0 | 3 | IMPLEMENTED | CURRENT ID |
| b | 20 GB | 0 | 2 | UNIMPLEMENTED | CURRENT ID |
| e | 30 GB | 0 | 2 | UNIMPLEMENTED | CURRENT ID |
| a | 5 GB | 0 | 1 | UNIMPLEMENTED | CURRENT ID |
| a | 5 GB | N/A | 0 | IMPLEMENTED | INVALID ID |

111g, 111h, 111i, 111j, 111k, 111l

112 WRITE AMOUNT MANAGEMENT TABLE

| STREAM ID | WRITE DATA AMOUNT |
|---|---|
| 0 | 5 GB |
| 1 | 5 GB |
| 2 | 50 GB |
| 3 | 30 GB |

113 SSD WRITE AMOUNT MANAGEMENT TABLE

| SSD ID | WRITE DATA INCREMENT |
|---|---|
| 1 | 0 |

STORAGE CONTROL APPARATUS AND COMPUTER-READABLE STORAGE MEDIUM STORING STORAGE CONTROL PROGRAM

CROSS-REFERENCE TO RELATED APPLICATION

This application is based upon and claims the benefit of priority of the prior Japanese Patent Application No. 2017-135335, filed on Jul. 11, 2017, the entire contents of which are incorporated herein by reference.

FIELD

The embodiments discussed herein are related to a storage control apparatus and a computer-readable storage medium storing a storage control program.

BACKGROUND

In a solid state drive (SSD), when a write request with new data is directed to the same logical address used in a previous write request, the new data is written to a different and unwritten page while original data remains as invalid data. For this reason, a large amount of invalid data remains in the physical storage space on the SSD and fills up its available capacity limit. In view of this, garbage collection is implemented to free up the physical storage space. In garbage collection, only valid data is written from its original block where free space has been depleted to a different block and data remaining in the original block is subsequently erased (flushed).

On the other hand, data written to a block may include both data of a high update frequency and data of a low update frequency. Therefore, non-updated data may be moved to a different block by the implementation of garbage collection. Because invalid data corresponding to the non-updated data does not exist, the movement of such data has no contribution to freeing up available space and is therefore said to be wasted. An increase in the number of internal writes to the SSD due to such wasted data movements leads to shortening of the life of the SSD or a slowdown in the speed of response to external access requests.

Standards on data stream control allowing appendment of attribute information (stream identifier (ID)) to data to be written to an SSD have been developed in view of the above-described problems. Upon a request to write data with a stream ID appended thereto, the SSD writes the data to a block associated with the appended stream ID amongst blocks each associated with a different stream ID. In the case of employing the standards, for example, appendment of different stream IDs to data of a high update frequency and data of a low update frequency makes garbage collection for the data of a low update frequency less likely to take place. As a result, it is possible to reduce the number of writes due to internal data movements on the SSD.

The following have been proposed as techniques for controlling writes to non-volatile memory.

For example, an information processing apparatus has been proposed, which allocates a plurality of logical address spaces to a plurality of spaces of a storage apparatus and transmits, to the storage apparatus, a command for the storage apparatus and data for identifying a space allocated to a logical address space corresponding to the command. Note that, according to the proposed information processing apparatus, each of the plurality of spaces is allocated to one or more write management areas included in the storage apparatus.

In addition, a storage controller has been proposed, which collectively rewrites data in a set of first small logical address regions having a low write frequency into an SSD and collectively rewrites remaining data in a set of second small logical address regions into the SSD. Further, a storage apparatus has been proposed, which includes a control circuit that exchanges a physical address on nonvolatile memory, corresponding to a predetermined logical address with a small number of rewrites, for a different physical address based on information about the number of rewrites for each logical address and then performs data movements according to the exchange.

Japanese Laid-open Patent Publication No. 2016-115355
International Publication Pamphlet No. WO 2014049678
International Publication Pamphlet No. WO 2006067839

In the case of appending a stream ID to data to be written to an SSD according to the update frequency of the data, as described above, there remains the following problem.

Assume, for example, that a different stream ID is assigned in advance to each of divided regions created by dividing logical storage space of the SSD. Then, assume that in transmitting, to the SSD, a write request to write data to a given divided region, a stream ID assigned to the divided region is appended to the write request to be transmitted. In this case, on the SSD, data is written to a different block according to each divided region.

Note that the update frequency of each divided region may change over time. When the update frequency of each divided region has changed, garbage collection will not bring a sufficient effect of reducing the number of writes. For example, in a situation where data in a given divided region is written to a specified block, if the update frequency of the divided region has gradually increased although it was low at the beginning, the block then includes both data of a high update frequency and data of a low update frequency. Therefore, when the block undergoes garbage collection, there is an increased possibility for valid data to be moved, which may result in increasing the number of writes on the SSD.

Note that the above-described problem is not specific to SSDs and is also seen across storage apparatuses equipped with flash memory.

SUMMARY

According to one embodiment, there is provided a storage control apparatus including a memory and a processor. The memory stores mapping management information indicating mappings between each of a plurality of divided regions created by dividing logical storage space on a storage apparatus and one of a plurality of identification numbers each representing a different write frequency. The processor executes a process including identifying, upon request for a data write to a write address included in any of the plurality of divided regions, an identification number associated with a divided region including the write address amongst the plurality of identification numbers based on the mapping management information, appending the identified identification number to a first write request for the write address, and transmitting the first write request with the identified identification number appended thereto to the storage apparatus; measuring a write frequency of each of the plurality of divided regions; updating the mappings indicated by the mapping management information based on results of the measuring; and identifying, upon request for a data write to the write address after the updating, an identification number associated with the divided region including the write address amongst the plurality of identification numbers based on the mapping management information, appending the identified identification number to a second write request for the write address, and transmitting the second write request with the identified identification number appended thereto to the storage apparatus.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 illustrates an example of write control on an SSD in the case where a plurality of unit regions has been assigned a single common stream ID.

FIG. 14 illustrates an example of data registered in the management tables in a first state.

FIG. 16 illustrates an example of data registered in the management tables in a second state.

FIG. 17 illustrates an example of data registered in the management tables in a third state.

FIG. 18 illustrates an example of data registered in the management tables in a fourth state.

FIG. 20 illustrates an example of data registered in the management tables in a fifth state.

DESCRIPTION OF EMBODIMENTS

Figure 1:
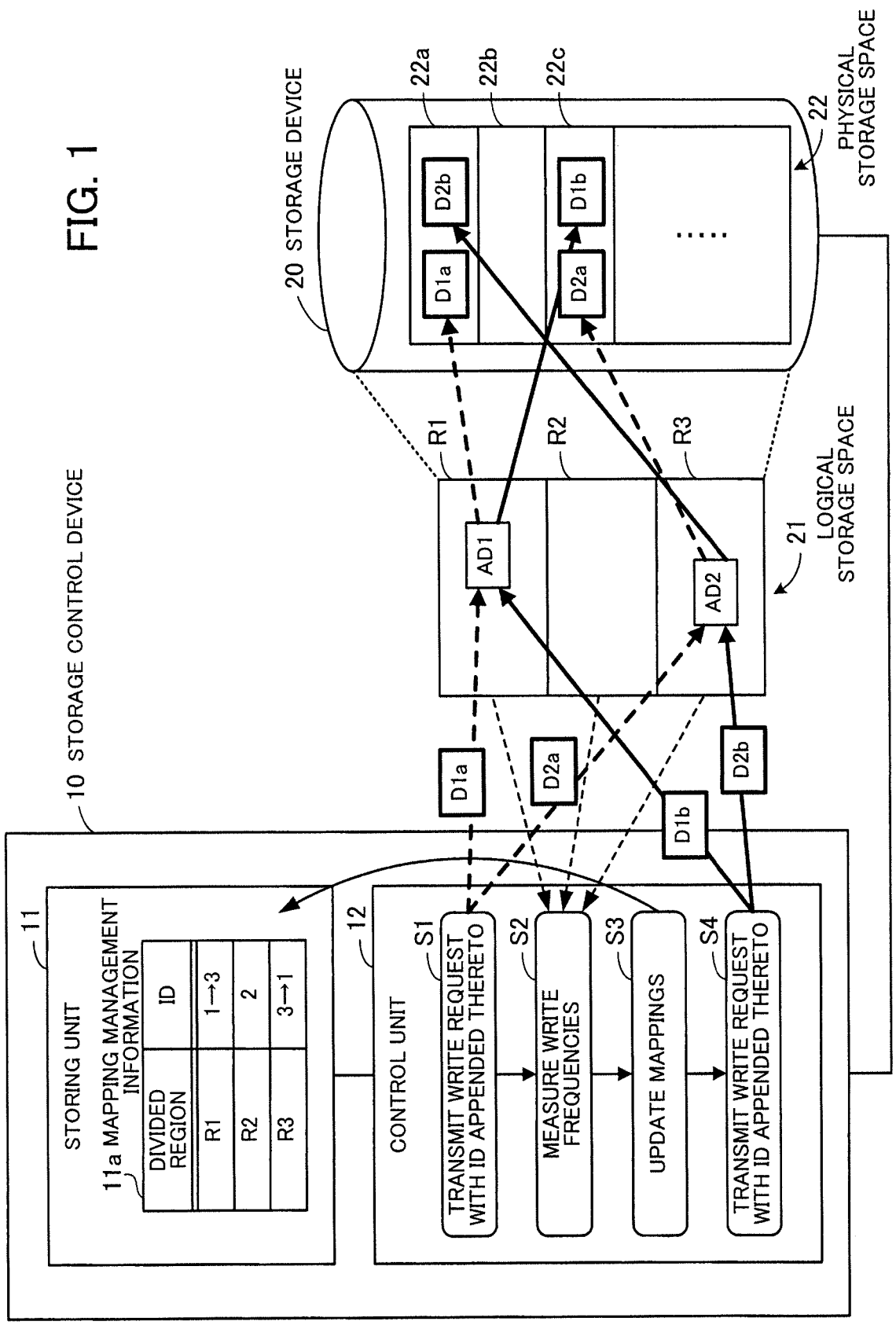
FIG. 1 illustrates a configuration and processing example of a storage control device according to a first embodiment.

Several embodiments will be described below with reference to the accompanying drawings. In the following description and the accompanying drawings, like reference numerals refer to like elements having substantially the same functions, and a repeated description thereof may be omitted.

(a) First Embodiment

FIG. 1 illustrates a configuration and processing example of a storage control device according to a first embodiment. A storage control device 10 of FIG. 1 is connected to a storage device 20 and controls data writes to the storage device 20. The storage device 20 is, for example, flash memory or an SSD with internal flash memory.

The storage control device 10 includes a storing unit 11 and a control unit 12. The storing unit 11 is implemented using storage space of a memory device, for example, random access memory (RAM) or a hard disk drive (HDD) (not illustrated), installed on the storage control device 10. The control unit 12 is implemented, for example, as a processor installed on the storage control device 10.

The storing unit 11 stores therein mapping management information 11a. The mapping management information 11a indicates mappings between a plurality of divided regions created by dividing logical storage space on the storage device 20 and a plurality of identification numbers (hereinafter referred to as "IDs"). Assume in this embodiment that the logical storage space 21 is divided into, for example, three to thereby form three divided regions R1 to R3. Also assume that each of the IDs takes a value amongst "1", "2", and "3".

Each of the IDs "1" to "3" represents a different write frequency of the corresponding divided region. Assume in this embodiment that an ID with a larger value is assigned to, for example, a divided region with a higher write frequency. Note that, in the case where the number of divided regions is larger than the number of values assigned as the IDs, a single ID value may be commonly associated with a plurality of divided regions.

Note here that physical storage space 22 of the storage device 20 is divided into, for example, a plurality of management regions 22a, 22b, 22c, and so on. Each of the management regions 22a, 22b, 22c, and so on is the unit of data deletion, and corresponds to a block in the case of flash memory and SSDs.

In this case, each of the IDs "1" to "3" is information used by being appended to data requested to be written, to control the storage device 20 to write the data to one of the management regions 22a, 22b, 22c, and so on according to the appended ID. That is, when a write request for data with the same ID appended thereto is issued, the storage device 20 writes the data to the same management region.

In addition, the storage device 20 runs, for example, garbage collection. For example, the storage device 20 selects a management region whose remaining storage capacity has decreased to or fallen below a predetermined limit and moves only valid data from the management region to a different unused management region. Then, the storage device 20 restores the management region from which the valid data has been read to unused state to make it available for new data to be written.

According to the first embodiment, each of the IDs "1" to "3" represents a different write frequency of the corresponding divided region, as mentioned above. Therefore, data belonging to divided regions having similar write frequencies is written to each management region. As a result, a management region to which data belonging to divided regions having higher write frequencies is written is more likely to undergo garbage collection. This means that each management region with a large amount of invalid data is likely to undergo garbage collection, which enhances the effect of invalid data reduction in the physical storage space 22. With this, the amount of valid data to be moved to a different block is reduced, which results in a reduced number of writes in the storage device 20 involved in garbage collection.

Note however that the above effects are not fully achieved in the case where the write frequencies of divided regions undergo changes. For example, when the write frequency of a divided region changes from high to low, a corresponding management region has frequent data updates at first and therefore a low valid data ratio; however, data updates are gradually reduced, and the valid data ratio therefore increases. For this reason, a large amount of valid data may need to be moved when garbage collection takes place.

In view of this, the control unit 12 of the first embodiment measures the write frequency of each of the divided regions R1 to R3, and dynamically changes IDs associated with the respective divided regions R1 to R3 based on the measurement results. Next described is processing performed by the control unit 12.

Assume first that, in the mapping management information 11a, the IDs "1", "2", and "3" are associated with the divided regions R1, R2, and R3, respectively. That is, in this case, the write frequencies of the divided regions R3, R2, and R1 have been determined to be higher in the stated order. Note that this association may be determined based on, for example, actual measured values of, or predictions made for, the write frequencies of the divided regions R1 to R3.

In this condition, upon request for a data write to a write address (logical address) included in one of the divided regions R1 to R3, the control unit 12 identifies an ID associated with a divided region including the write address based on the mapping management information 11a. Then, the control unit 12 appends the identified ID to a write request for a data write to the write address, which is then transmitted to the storage device 20 (step S1).

Assume for example that a request to write data D1a to a write address AD1 in the divided region R1 is made. In this case, the control unit 12 extracts the ID "1" associated with the divided region R1 from the mapping management information 11a. The control unit 12 appends the ID "1" to a write request to write the data D1a to the write address AD1 and then transmits the write request with the ID "1" appended thereto to the storage device 20. According to the appended ID "1", the storage device 20 writes the data D1a to the management region 22a, for example.

In addition, assume for example that a request to write data D2a to a write address AD2 in the divided region R3 is made. In this case, the control unit 12 extracts the ID "3" associated with the divided region R3 from the mapping management information 11a. The control unit 12 appends the ID "3" to a write request to write the data D2a to the write address AD2 and then transmits the write request with the ID "3" appended thereto to the storage device 20. According to the appended ID "3", the storage device 20 writes the data D2a to, for example, the management region 22c, which is different from the management region 22a.

Next, the control unit 12 measures the write frequency of each of the divided regions R1 to R3 (step S2). Then, based on the write frequency measurement results, the control unit 12 updates the association (i.e., mappings) indicated in the mapping management information 11a (step S3).

Assume here that the measurement results indicate that, for example, the write frequencies of the divided regions R1, R2, and R3 are higher in the stated order. That is, the write frequency of the divided region R1 has increased while the write frequency of the divided region R3 has decreased. In this case, the control unit 12 updates the mapping management information 11a in such a manner that the IDs "3", "2", and "1" are associated with the divided regions R1, R2, and R3, respectively.

Next, upon request for a data write to a write address included in one of the divided regions R1 to R3 after the update of the mapping management information 11a, the control unit 12 identifies an ID associated with a divided region including the write address based on the updated mapping management information 11a. Then, the control unit 12 appends the identified ID to a write request for a data write to the write address, which is then transmitted to the storage device 20 (step S4).

Assume for example that a request to write data D1b, which is an update of the data D1a, to the write address AD1 in the divided region R1 is made. In this case, the control unit 12 extracts the ID "3" associated with the divided region R1 from the mapping management information 11a. The control unit 12 appends the ID "3" to a write request to write the data D1b to the write address AD1 and then transmits the write request with the ID "3" appended thereto to the storage device 20. According to the appended ID "3", the storage device 20 writes the data D1b to the management region 22c.

In addition, assume for example that a request to write data D2b, which is an update of the data D2a, to the write address AD2 in the divided region R3 is made. In this case, the control unit 12 extracts the ID "1" associated with the divided region R3 from the mapping management information 11a. The control unit 12 appends the ID "1" to a write request to write the data D2b to the write address AD2 and then transmits the write request with the ID "1" appended thereto to the storage device 20. According to the appended ID "1", the storage device 20 writes the data D2b to the management region 22a.

Herewith, although the write frequencies of the divided regions R1 and R3 have changed, data belonging to divided regions with low write frequencies is written to the management region 22a while data belonging to divided regions with high write frequencies is written to the management region 22c. As a result, in the storage device 20, the valid data ratio of the management region 22c is less likely to increase, and the management region 22c is more likely to undergo garbage collection compared to the management region 22a. Therefore, the amount of valid data to be moved by garbage collection is reduced, which results in a reduced number of writes on the storage device 20.

(b) Second Embodiment

Next described is an example of a storage system in which SSDs are used as write control targets of a storage control device.

Figure 2:
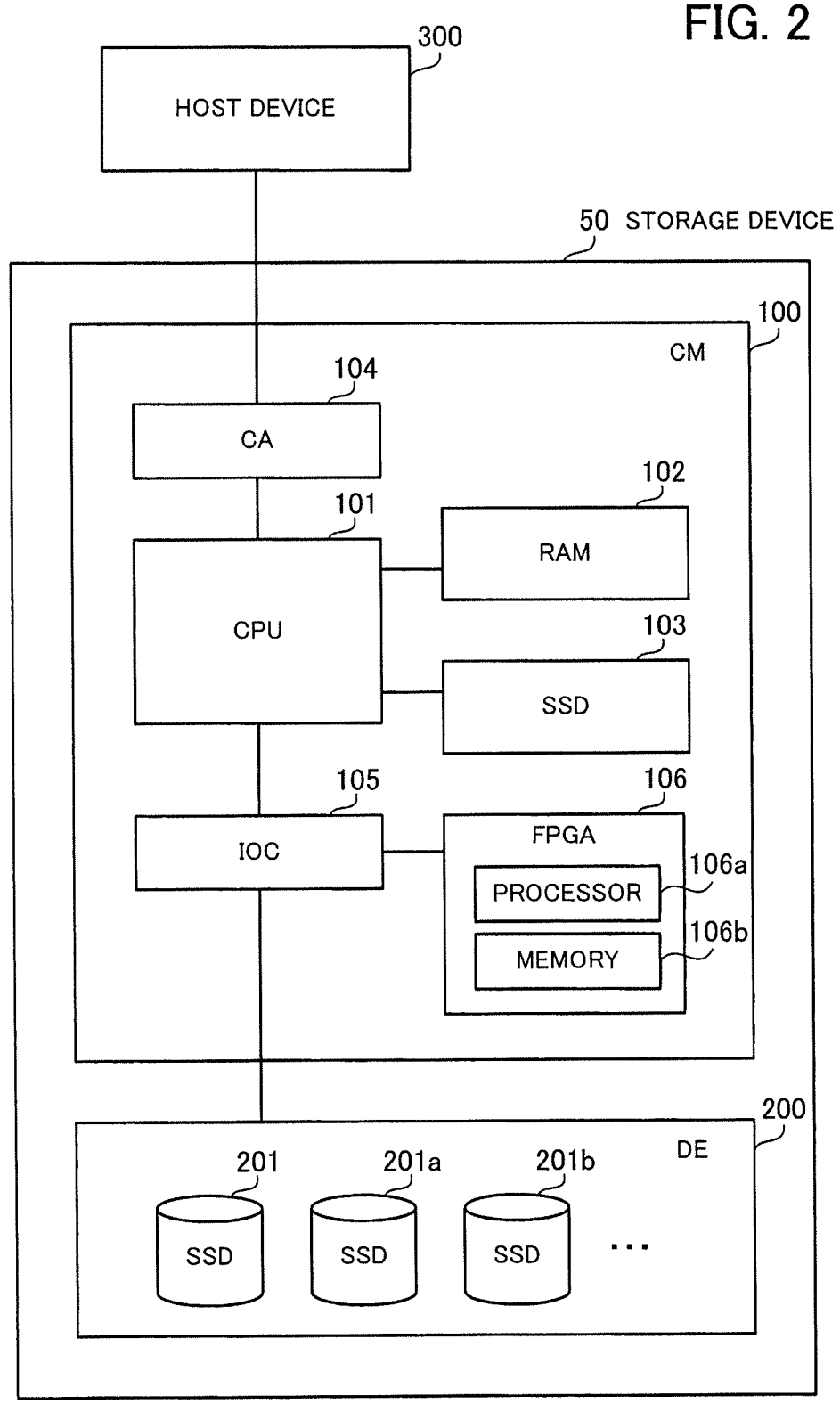
FIG. 2 illustrates a configuration example of a storage system according to a second embodiment.

FIG. 2 illustrates a configuration example of a storage system according to a second embodiment. The storage system of FIG. 2 includes a storage device 50 and a host device 300. The storage device 50 includes a controller module (CM) 100 and a drive enclosure (DE) 200. The host device 300 is connected to the controller module 100 via a storage area network (SAN) using, for example, Fibre Channel (FC) or Internet Small Computer System Interface (iSCSI).

The controller module 100 is a storage control device for controlling access to storage devices installed in the drive enclosure 200 in response to requests from the host device 300. In the drive enclosure 200, SSDs 201, 201a, 201b, and so on are installed as storage devices to be accessed from the host device 300. Note that, in this embodiment, only at least one SSD needs to be installed in the drive enclosure 200 as a storage device to be accessed from the host device 300, and the remaining storage devices may be different types of non-volatile storage devices, such as HDDs.

Through executing its predetermined processing such as operational processing, the host device 300 accesses the storage devices in the drive enclosure 200 via the controller module 100. Specifically, the controller module 100 provides the host device 300 with a logical volume using the storage devices in the drive enclosure 200, and the host device 300 requests the controller module 100 for access to the logical volume to thereby access the storage devices in the drive enclosure 200. Note that the controller module 100 may provide a plurality of logical volumes for the host device 300. In addition, a plurality of host devices 300 may be connected to the controller module 100 in such a manner that one or more host devices 300 are allowed to access one or more logical volumes.

Next described is an example of a hardware configuration of the controller module 100.

The controller module 100 includes a central processing unit (CPU) 101, RAM 102, an SSD 103, a channel adapter (CA) 104, an input output controller (IOC) 105, and a field programmable gate array (FPGA) 106.

Overall control of the controller module 100 is exercised by the CPU 101. The CPU 101 may be, for example, a multi-processor. The RAM 102 is used as a main storage device of the controller module 100, and temporarily stores therein at least part of an operating system (OS) program and application programs to be executed by the CPU 101. The RAM 102 also stores therein various types of data to be used by the CPU 101 for its processing. The SSD 103 is used as a secondary storage device of the controller module 100. The SSD 103 stores therein the OS program, application programs, and various types of data. Note that a different type of non-volatile storage device, such as an HDD, may be used as a secondary storage device in place of the SSD 103.

The channel adapter 104 is an interface used to communicate with the host device 300. The IOC 105 is an interface used to communicate with the SSDs 201, 201a, 201b, and so on in the drive enclosure 200. In the second embodiment, the IOC 105 is a SAS (Serial-Attached SCSI (Small Computer System Interface)) interface, for example. In this case, for example, the drive enclosure 200 is provided with a SAS expander, and the IOC 105 communicates with the SSDs 201, 201a, 201b, and so on via the SAS expander.

When the CPU 101 requests the IOC 105 for an output of a write command for writing data to an SSD in the drive enclosure 200, the FPGA 106 acquires the write command from the IOC 105. The FPGA 106 determines a stream ID to be appended to the data to be written (hereinafter simply referred to as "write data") and causes the IOC 105 to transmit the write command with the stream ID appended thereto.

Stream IDs are identification numbers each indicating an attribute of write data included in a write command and are set forth in Storage Intelligence specifications. Each SSD controls, for example, write data with the same stream ID appended thereto to be written to the same block.

The FPGA 106 determines to which unit region write data belongs. Unit regions are created by partitioning, according to conditions of some kind, the entire logical storage space recognized by the host device 300 and targeted for access made by the host device 300. The expression "write data belongs to a unit region" is used here to indicate that a write command including the write data has been output in response to a write request for the unit region from the host device 300.

The FPGA 106 measures the write frequency of each unit region. The FPGA 106 determines a stream ID according to the write frequency of the unit region to which the write data belongs and notifies the IOC 105 of the stream ID as a stream ID to be appended to the write data. Further, according to changes in the write frequency of each unit region, the FPGA 106 dynamically changes stream IDs to be each appended to write data belonging to the same unit region.

Note that the FPGA 106 includes a processor 106a and memory 106b. The processor 106a may be implemented, for example, as an integrated circuit that integrates operational circuits, such as a CPU and a digital signal processor (DSP), or a collection of a large number of logic circuits. Alternatively, the processor 106a may include both an integrated circuit and a plurality of logic circuits.

The memory 106b may be implemented, for example, as a memory circuit that integrates storage elements, such as Dynamic RAM (DRAM) and Static RAM (SRAM), or a collection of storage elements such as flip-flops. Alternatively, the memory 106b may include both an integrated memory circuit and a plurality of storage elements. In addition, at least part of the memory 106b may be connected to the outside of the FPGA 106.

Figure 3:
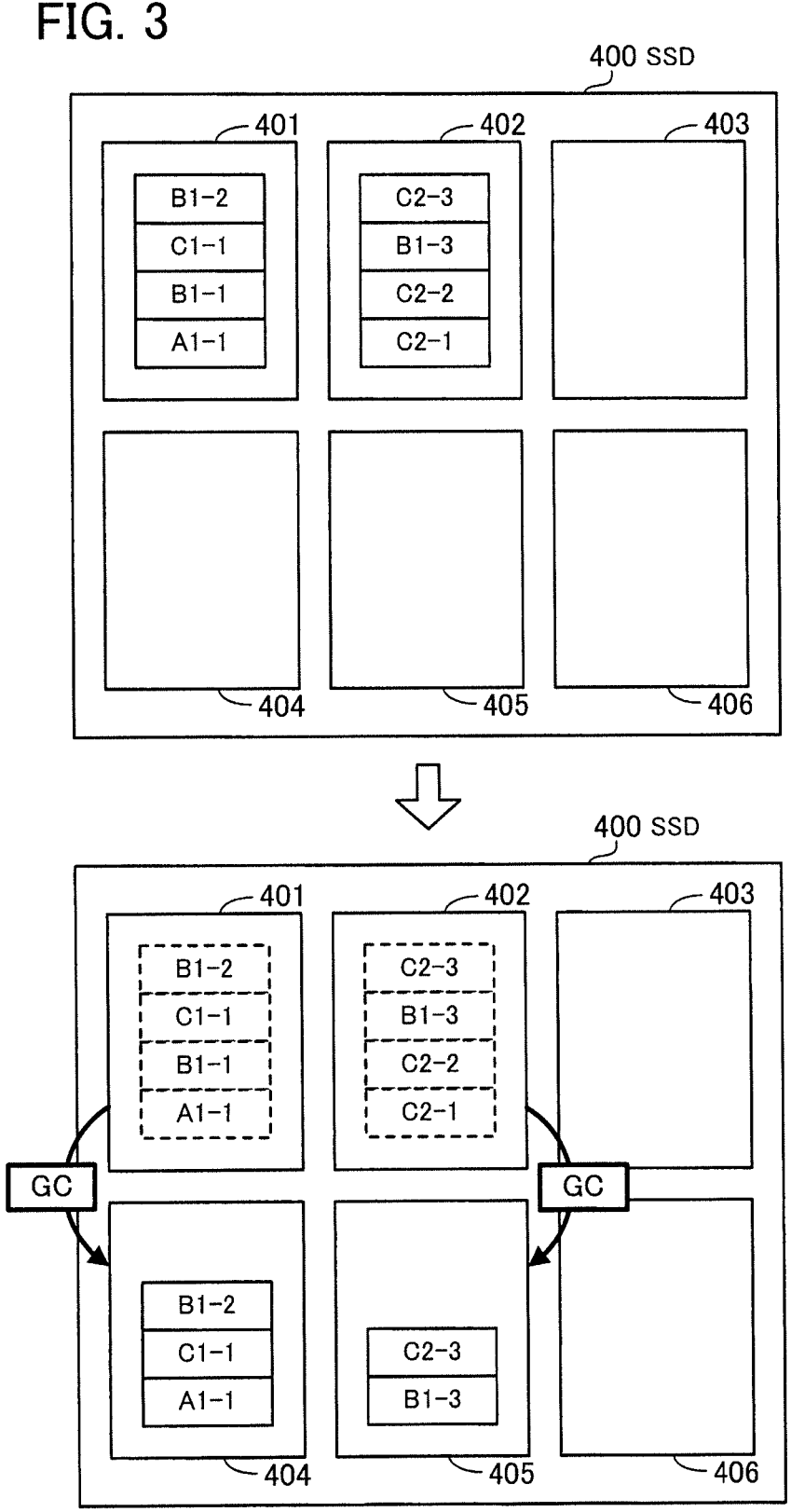
FIG. 3 illustrates a comparative example of write control on an SSD with no use of stream IDs.
Figure 4:
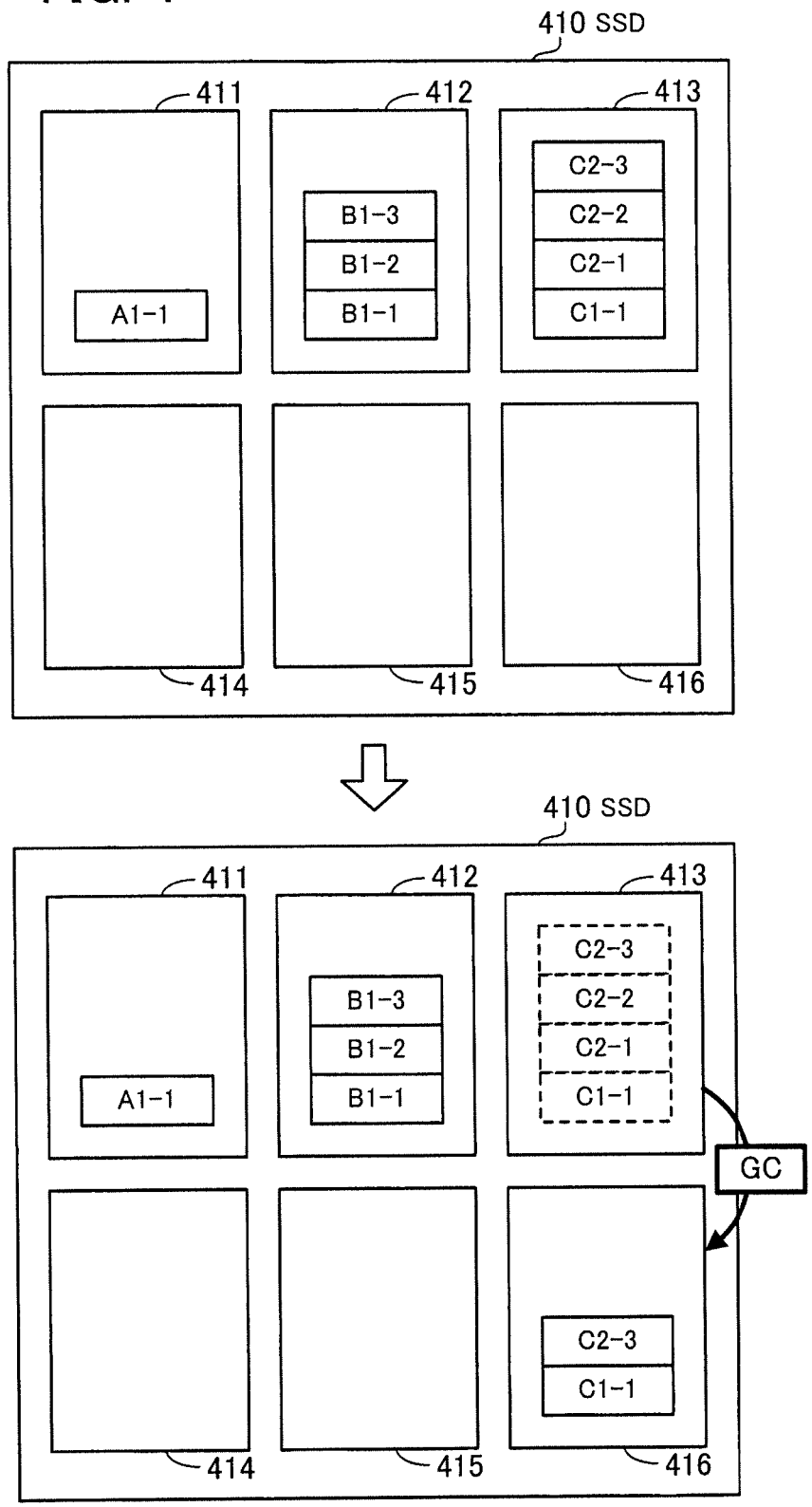
FIG. 4 illustrates a comparative example of write control on an SSD with use of stream IDs.

Next described are comparative examples of write control on an SSD with reference to FIGS. 3 to 5.

First, FIG. 3 illustrates a comparative example of write control on an SSD with no use of stream IDs. An SSD 400 of FIG. 3 includes blocks 401 to 406. Each of the blocks 401 to 406 is the smallest unit of written data storage that is erasable at a time.

Assume that data pieces A1-1, B1-1, C1-1, B1-2, C2-1, C2-2, B1-3, and C2-3 are requested in the stated order to be written to the above-described SSD 400. Note that, in the following description, the phrase "data piece" is used for clarification to refer to individual data items on an as-needed basis; otherwise the simple term "data" is used when there is no need to make a distinction. The data pieces B1-2 and B1-3 are update data pieces used to update the data pieces B1-1 and B1-2, respectively. In addition, the data pieces C2-2 and C2-3 are update data pieces used to update the data pieces C2-1 and C2-2, respectively. In other words, the data pieces B1-1, B1-2, and B1-3 are data requested to be written to the same logical address on the SSD 400. The data pieces C2-1, C2-2, and C2-3 are also data requested to be written to the same logical address on the SSD 400.

A controller (not illustrated) installed on the SSD 400 writes the data pieces requested to be written to free blocks in sequence. For example, as illustrated in the upper part of FIG. 3, the controller writes the data pieces A1-1, B1-1, C1-1, and B1-2 to the block 401 and the data pieces C2-1, C2-2, B1-3, and C2-3 to the block 402. Because data overwrite in the physical storage space of SSDs is not possible, the update data pieces are written to different areas from those of their original data pieces. The original data pieces are left in the physical storage space as invalid data.

In addition, the controller performs garbage collection to gather only valid data to a different block in order to create more free space, for example, when the remaining storage capacity of the physical storage space on the SSD 400 has fallen below a predetermined limit. For example, as illustrate in the lower part of FIG. 3, the controller performs garbage collection on each of the blocks 401 and 402 that has run out of free space.

Specifically, the controller moves only the data pieces A1-1, C1-1, and B1-2, which are valid data, amongst the data written to the block 401 to the different block 404. The controller also moves only the data pieces B1-3 and C2-3, which are valid data, amongst the data written to the block 402 to the different block 405. Herewith, because all the data included in the blocks 401 and 402 is now invalid data, the controller flushes the blocks 401 and 402 to make them available for new data to be written.

Implementation of the above-described garbage collection increases the remaining storage capacity of the SSD 400 by the amount of invalid data deleted. According to the above method, however, when both data pieces of high update frequencies and non-updated data pieces are included in the same block, the non-updated data pieces are also moved to a different block. Because no invalid data corresponding to data exists unless the data has been updated, the movement of such data to a different block by garbage collection make no contribution to increasing free space. Therefore, there is in principle no need to move non-updated data.

In the example of FIG. 3, because each of the data pieces B1-1 and B1-2 written to the block 401 has been updated once, the invalid data piece B1-1 is deleted by garbage collection while only the valid data piece B1-2 is left. However, the data piece A-1 written to the same block 401 has not been updated, and there is therefore no corresponding invalid data. Hence, the data piece A-1 is moved to the block 404 although the movement makes no contribution to increasing free space.

Such movements and writes of data to different blocks, although the data does not actually need to be moved, increase the amount of write data, thereby leading to shortening of the life of the SSD. In addition, the increase of the amount of write data involved in garbage collection slows down external access to the SSD.

FIG. 4 illustrates a comparative example of write control on an SSD with use of stream IDs. Appending, to each write data piece, a stream ID according to the data update frequency is one conceivable solution to the above-described problems. For example, the data piece A1-1 is determined to belong to a unit region with the lowest update frequency and then assigned a given stream ID. In addition, the data pieces B1-1, B1-2, and B1-3 are determined to belong to a unit region with a moderate update frequency and then assigned a stream ID different from that of the data piece A1-1. Further, the data pieces C1-1, C2-1, C2-2, and C2-3 are determined to belong to a unit region with the highest update frequency and then assigned a stream ID yet different from those of the data pieces A1-1, B1-1, B1-2, and B1-3.

Assume that, when the stream IDs have been assigned as described above, the data pieces A1-1, B1-1, C1-1, B1-2, C2-1, C2-2, B1-3, and C2-3 are requested in the stated order to be written to an SSD 410, as in the case of FIG. 3. Note that the SSD 410 includes blocks 411 to 416. In this case, a controller (not illustrated) installed on the SSD 410 writes the data pieces requested to be written to different blocks according to their stream IDs. For example, as illustrated in the upper part of FIG. 4, the controller writes the data piece A1-1 to the block 411; the data pieces B1-1, B1-2, and B1-3 to the block 412; and the data pieces C1-1, C2-1, C2-2, and C2-3 to the block 413.

In addition, the controller performs garbage collection on the block 413 with reduced free space as illustrated in the lower part of FIG. 4, for example, when the remaining storage capacity of the physical storage space on the SSD 410 has fallen below a predetermined limit. That is, the controller moves only the data pieces C1-1 and C2-3, which are valid data, amongst the data written to the block 413 to the different block 416. Then, the controller flushes the block 413.

Thus, the above-described processing allows only the block storing data belonging to the unit region of a high update frequency to undergo garbage collection and prevents the data piece A1-1 belonging to the unit region of a low update frequency from being moved. Therefore, data not needing to be moved is less likely to be written to a different block, thus reducing the amount of write data involved in the implementation of garbage collection.

Note here that, in the method of using stream IDs, it is sometimes the case that a plurality of unit regions needs to be assigned a single common stream ID due to a limited number of assignable stream IDs being available. For example, in the case of employing logical volumes as unit regions, a large number of logical volumes may be created on the storage device. In such a case, a conceivable approach would be to commonly assign a single stream ID to a plurality of logical volumes.

FIG. 5 illustrates an example of write control on an SSD in the case where a plurality of unit regions has been assigned a single common stream ID. Assume that an SSD 420 of FIG. 5 includes blocks 421 to 429. Assume also that stream IDs are assigned in advance to unit regions in the following manner: a given stream ID to a unit region A; a different stream ID to unit regions B and C; and a yet different stream ID to unit regions D and E. Then, assume in this example that the unit regions B and C are expected to have higher update frequencies than that of the unit region A while the unit regions D and E are expected to have higher update frequencies than those of the unit regions B and C.

In the above-described condition, the following data pieces are written to the SSD 420: data piece A1-1 belonging to the unit region A; data pieces B1-1 and B2-1 belonging to the unit region B; data piece C1-1 belonging to the unit region C; data pieces D1-1, D1-2, and D1-3 belonging to the unit region D; and data pieces E1-1, E1-2, and E1-3 belonging to the unit region E. The SSD 420 sorts destination blocks for the individual data pieces based on the stream IDs appended to the data pieces. For example, as illustrated in the upper part of FIG. 5, the data piece A1-1 is written to the block 421; the data pieces B1-1, B2-1, and C1-1 are written to the block 422; and the data pieces D1-1, D1-2, D1-3, E1-1, E1-2, and E1-3 are written to the block 423.

Because the block 423 has run out of free space due to the data writes, garbage collection is performed on the block 423. Herewith, the data pieces D1-3 and E1-3 are moved to the block 426, and the block 423 is then flushed. The upper part of FIG. 5 represents the state of the SSD 420 at this point of time.

Up to this point, the unit regions D and E with the same stream ID assigned thereto have had almost the same update frequency. However, also among a plurality of unit regions to which a single stream ID has been assigned in advance, their update frequencies may change with time. For example, assume that, in the state depicted in the upper part of FIG. 5, additional data pieces E2-1, E1-4, E2-2, and E1-5 belonging to the unit region E are written to the SSD 420. However, no data writes to the unit region D take place, and the update frequency of the unit region D decreases compared to the unit region E.

The above data pieces newly written to the SSD 420 are written to the block 426. As a result, the block 426 runs out of free space, and garbage collection is performed on the block 426. For example, as illustrated in the lower part of FIG. 5, the data pieces D1-3, E1-5, and E2-2 are moved to the block 429 and the block 426 is then flushed. This garbage collection moves the data piece D1-3 which has not been updated, and thus involves a wasted data movement.

As just described, the method of preliminarily assigning fixed stream IDs to individual unit regions does not bring a sufficient effect of reducing the amount of write data when there is a unit region whose update frequency has changed from its original forecast. In view of this, according to the second embodiment, the FPGA 106 of the controller module 100 measures the update frequency of each unit region and dynamically changes stream IDs assigned to unit regions according to temporal changes in the update frequencies. Herewith, it is possible to optimize data to be moved inside an SSD by garbage collection and thereby reduce the amount of write data involved in the movement.

Note that FIG. 5 represents the case in which a plurality of unit regions is assigned a single common stream ID. However, also in the case where each unit region is assigned a single stream ID, garbage collection will not bring a sufficient effect of reducing the amount of data movement when the update frequency of the unit region has changed over time. For example, in a situation where data pieces belonging to a unit region are written to a given block, if the update frequency of the unit region has increased although it was low at the beginning, the block then includes both data pieces of high update frequencies and data pieces of low update frequencies. Implementing garbage collection on the block in such a situation may result in movement of a lot of valid data to a different block, and in that case, the garbage collection will not bring a sufficient effect of reducing the amount of write data.

According to the second embodiment, stream IDs assigned to unit regions are dynamically changed according to temporal changes in the update frequencies, which allows data of high update frequencies to be brought together into the same block. Therefore, even in the case where each unit region is assigned a single stream ID, it is possible to achieve an effect of reducing the amount of data movement involved in garbage collection.

Next described are details of processes carried out by the controller module 100 according to the second embodiment. In the following description, logical volumes configured on the controller module 100 are used as an example of the unit regions.

Figure 6:
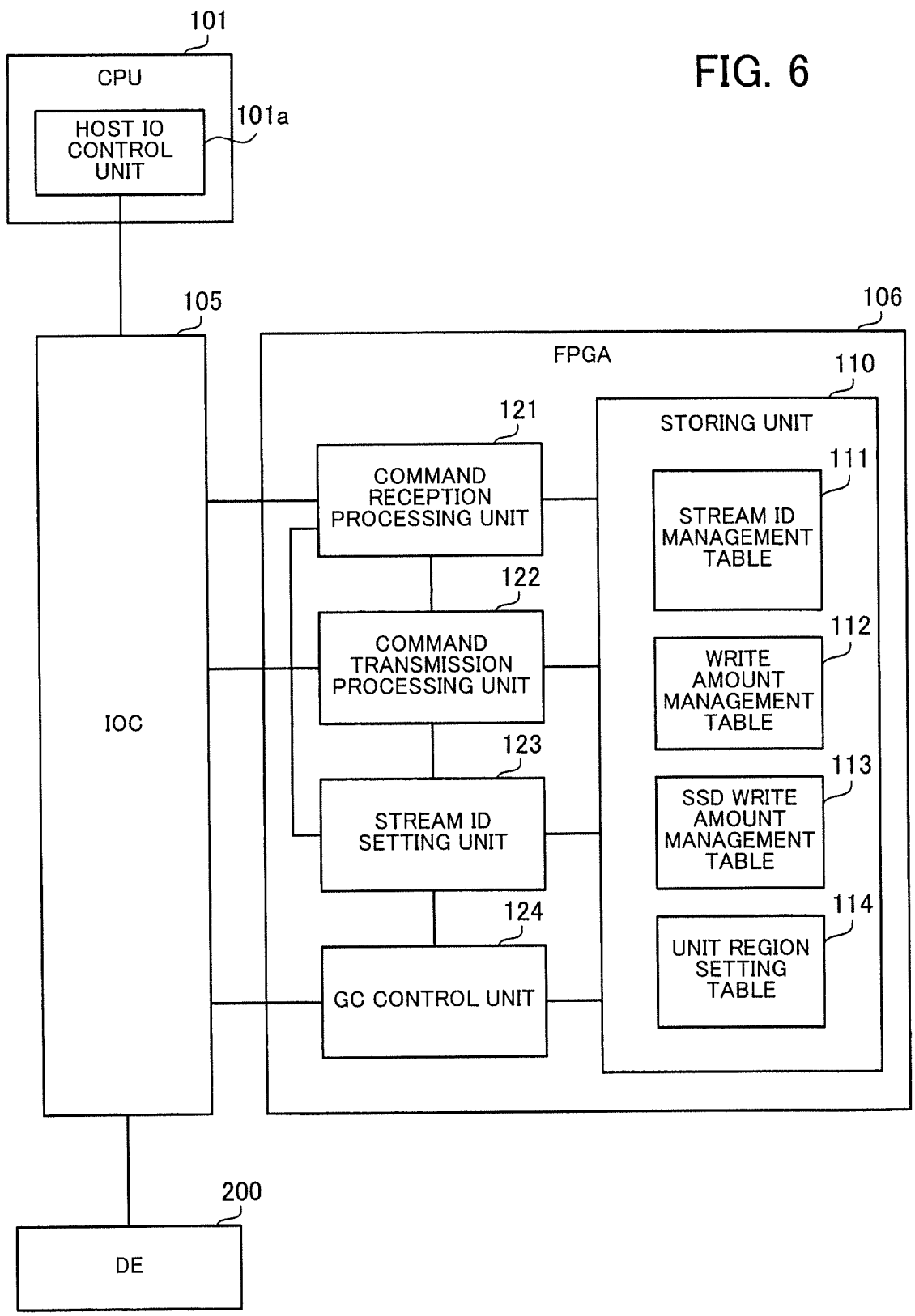
FIG. 6 is a block diagram illustrating a configuration example of processing functions of a controller module.

FIG. 6 is a block diagram illustrating a configuration example of processing functions of the controller module. The controller module 100 includes a host input output (IO) control unit 101a. Processing carried out by the host IO control unit 101a is implemented by the CPU 101 executing a predetermined application program.

The host IO control unit 101a receives an access request for a logical volume from the host device 300. At this time, the host IO control unit 101a receives, as access addresses, a logical unit number (LUN) for identifying a logical volume and a logical block address (LBA) indicating an address on the logical volume.

Address space of each logical volume is associated with logical address space of the SSDs 201, 201a, 201b, and so on of the drive enclosure 200. The host IO control unit 101a converts the LUN and LBA indicating the access destination into a disk ID for identifying a corresponding SSD and a logical address on the SSD. The host IO control unit 101a requests the IOC 105 to issue a command with the disk ID and the logical address on the SSD designated as the access destination. Note here that, in the case of requesting for issuance of a write command, the host IO control unit 101a also informs the IOC 105 about the LUN and LBA before the conversion.

In the case of receiving a request for issuance of a read command from the host IO control unit 101a, the IOC 105 transmits a read command with a disk ID and a logical address on an SSD designated as read addresses to a read-source SSD in the drive enclosure 200. The IOC 105 receives read data returned from the read-source SSD in response to the read command, and then transfers the read data to the host IO control unit 101a.

On the other hand, in the case of receiving a request for issuance of a write command from the host IO control unit 101a, the IOC 105 passes a created write command first to the FPGA 106. At this time, the IOC 105 adds the LUN and LBA informed by the host IO control unit 101a to the write command and then passes the write command to the FPGA 106. The IOC 105 receives a write command with a stream ID appended thereto from the FPGA 106, and then transmits the write command to a write-destination SSD in the drive enclosure 200.

Next described are processing functions of the FPGA 106.

The FPGA 106 includes a storing unit 110, a command reception processing unit 121, a command transmission processing unit 122, a stream ID setting unit 123, and a garbage collection (GC) control unit 124.

The storing unit 110 is implemented using storage space of the memory 106b installed in the FPGA 106. The storing unit 110 stores therein a stream ID management table 111, a write amount management table 112, an SSD write amount management table 113, and a unit region setting table 114.

Figure 7:
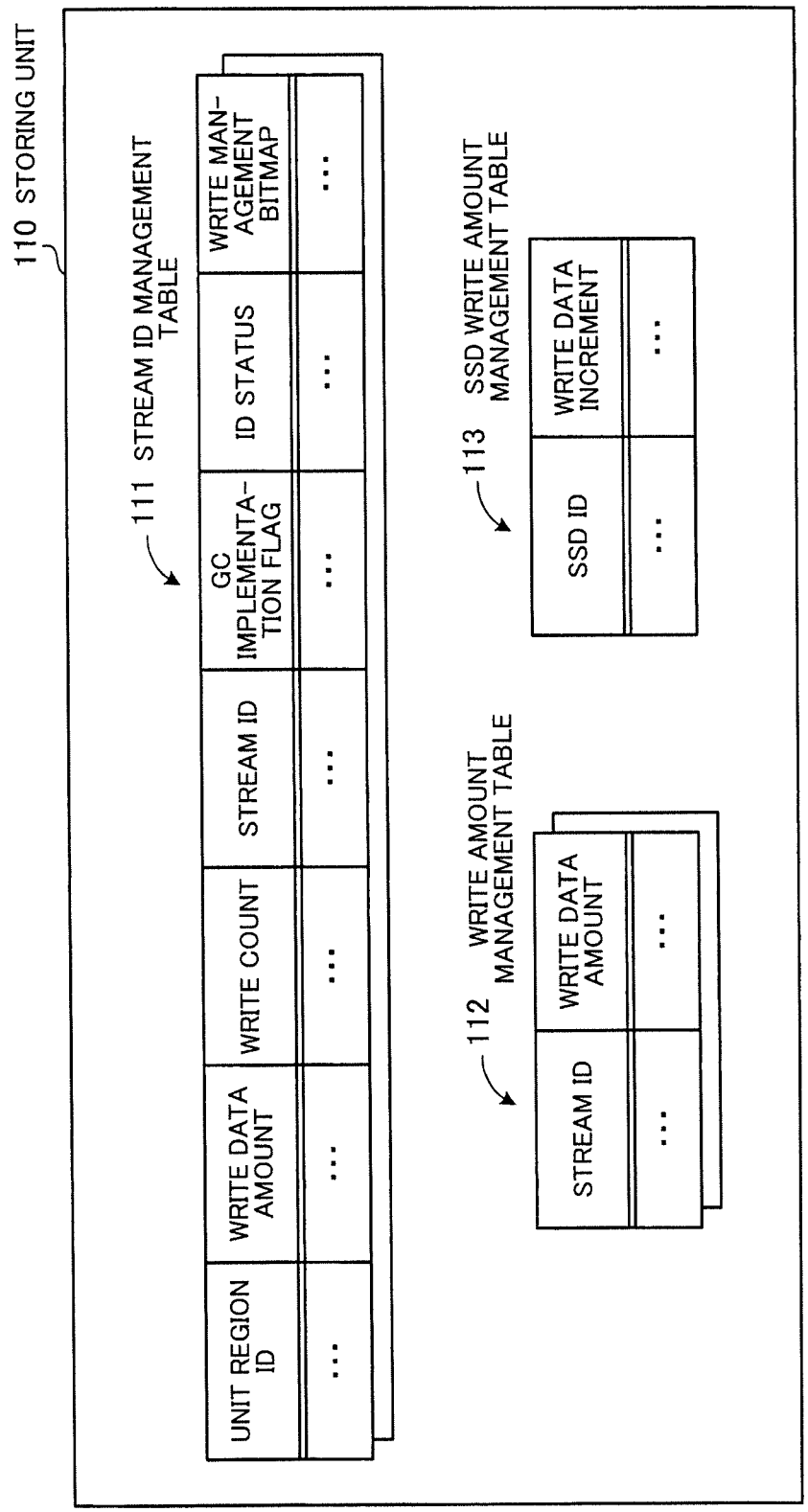
FIG. 7 illustrates a configuration example of a stream ID management table, a write amount management table, and an SSD write amount management table.

FIG. 7 illustrates a configuration example of the stream ID management table, the write amount management table, and the SSD write amount management table.

The stream ID management table 111 is created for each of the SSDs 201, 201a, 201b, and so on installed in the drive enclosure 200 and then stored. The stream ID management table 111 is a table for mainly holding the number of writes and the amount of write data for each unit region in the corresponding SSD and stream IDs assigned to individual unit regions. The stream ID management table 111 includes the following items: unit region ID; write data amount; write count; stream ID; GC implementation flag; ID status; and write management bitmap.

Each field under the item "unit region ID" contains an identification number for identifying a corresponding unit region. Each field under the item "write data amount" contains the amount of write data written to the corresponding unit region. Each field under the item "write count" contains the number of data writes made to the corresponding unit region following a stream ID update process for updating stream ID assignments to unit regions.

Each field under the item "stream ID" contains a stream ID assigned to the corresponding unit region. Each field under the item "GC implementation flag" contains flag information indicating whether garbage collection has been implemented on the corresponding unit region upon request of the FPGA 106.

Each field under the item "ID status" contains information indicating the status of the stream ID registered in the same record. One of the following is registered in each field: "current ID"; "former ID"; and "invalid ID". The "current ID" indicates that the registered stream ID is a stream ID assigned in the latest update process. The "former ID" indicates that the registered stream ID is a stream ID assigned prior to the implementation of the latest update process. The "invalid ID" indicates that data with the registered stream ID appended thereto has all been invalidated from the SSD. Note that, as described later, the stream ID management table 111 may include a plurality of records each including different ID status although the same stream ID is registered in their fields under the item "stream ID".

Each field under the item "write management bitmap" contains bitmap data including a bit corresponding to each LBA on the corresponding unit region. The initial value of each bit is "0", and when a write to the corresponding unit region is requested, the bit value corresponding to each of write-destination LBAs is updated with "1". Herewith, the bitmap data manages, amongst the LBAs in the corresponding unit region, LBAs to which data has been written once or more times.

Note that, as described later, new records are added to the stream ID management table 111 each time the stream ID update process is performed. Therefore, the bitmap data registered under the item "write management bitmap" manages LBAs to which data has been written after the stream ID update process. In addition, the bitmap data is used to calculate the amount of valid data written in each unit region after the stream ID update process.

The write amount management table 112 is created for each of the SSDs 201, 201a, 201b, and so on installed in the drive enclosure 200 and then stored. The write amount management table 112 includes items of stream ID and write data amount. Each field under the item "stream ID" contains a currently assigned stream ID. Each field under the item "write data amount" contains the cumulative amount of write data written to all unit regions to which the corresponding stream ID has been assigned after the implementation of the stream ID update process.

The SSD write amount management table 113 includes items of SSD ID and write data increment. Each field under the item "SSD ID" contains an identification number for identifying each of the SSDs 201, 201a, 201b, and so on installed in the drive enclosure 200. Each field under the item "write data increment" contains the cumulative amount of write data written to the corresponding SSD. The write data increment is reset to "0" when it reaches a predetermined amount. For this reason, the write data increment indicates the increased amount of data written to the corresponding SSD after a reset is done.

Referring back to FIG. 6, the following continues the description of the processing functions of the controller module 100.

The unit region setting table 114 is created for each unit region and then stored. The unit region setting table 114 holds mappings between LBAs in the corresponding unit region, i.e., logical volume, and logical addresses on an SSD. The unit region setting table 114 is registered in the storing unit 110 of the FPGA 106 through processing of the CPU 101, for example, each time a new logical volume is configured on the controller module 100. Then, the unit region setting table 114 is used to convert LBAs in the corresponding unit region to logical addresses on an SSD when the FPGA 106 requests the SSD to implement garbage collection on data written to the unit region.

Note that, using the stream ID management table 111, the FPGA 106 manages the cumulative amount of write data, the number of data writes, and the amount of written valid data with respect to each unit region. As described above, logical address space of each SSD is allocated to logical address space of logical volumes corresponding to unit regions. Therefore, managing the information above for each unit region practically amounts to managing the information for each logical address region in the SSD, allocated to the unit region.

For this reason, the FPGA 106 may manage the aforementioned information, for example, for each logical address region in a corresponding SSD instead of managing it for each unit region. In this case, for example, no notification about an LUN and LBA needs to be made by the host IO control unit 101a to the FPGA 106 via the IOC 105. Instead, by referring to the unit region setting table 114, for example, the FPGA 106 is able to determine to which unit region an SSD logical address included in each write command belongs. In addition, the bits included in each field under the item "write management bitmap" within the stream ID management table 111 may be individually associated with each logical address of the SSD, instead of each LBA of the unit region (logical volume).

Processing carried out by the command reception processing unit 121, the command transmission processing unit 122, the stream ID setting unit 123, and the GC control unit 124 is implemented by the processor 106a of the FPGA 106.

When the IOC 105 is requested by the host IO control unit 101a to transmit a write command, the command reception processing unit 121 acquires the write command together with the LUN and LBA notified by the host IO control unit 101a. The command reception processing unit 121 determines, based on the LUN, a logical area to which the write data will belong, and updates, in the stream ID management table 111, the amount of write data, the write count, and the write management bitmap corresponding to the determined logical area. In addition, the command reception processing unit 121 updates the write amount management table 112 and the SSD write amount management table 113 based on the size of the write data.

The command transmission processing unit 122 acquires, from the stream ID management table 111, a stream ID assigned to the logical area determined by the command reception processing unit 121. The command transmission processing unit 122 appends the acquired stream ID to the write command acquired by the command reception processing unit 121, and then passes the write command to the IOC 105 and requests transmission of the write command.

Each time, in the SSD write amount management table 113, the write data increment in an SSD reaches a predetermined amount, the stream ID setting unit 123 updates stream IDs to be assigned to individual unit regions associated with the SSD. In this regard, the stream ID setting unit 123 refers to the stream ID management table 111 and updates the stream IDs to be assigned to the individual unit regions based on the write count of each of the unit regions. This ensures appropriate assignments of the stream IDs to the individual unit regions.

With this update process, the stream IDs associated with the unit regions in the stream ID management table 111 are updated. After this, data writes to unit regions are requested, and write commands each with a post-update stream ID appended thereto are transmitted from the IOC 105 under the control of the command transmission processing unit 122. In this manner, appropriate write data sorting into destination blocks on a corresponding SSD is increasingly achieved. This leads to progressive optimization of data targeted for garbage collection to be implemented based on the judgment of the SSD itself, and thus results in a reduced amount of ineffectual data writes involved in garbage collection.

In the case where the size of free space in the physical storage space on an SSD has decreased below a predetermined limit, the GC control unit 124 causes the SSD to implement garbage collection on, among data written to the SSD, data to which each stream ID satisfying a predetermined condition is appended. Specifically, the GC control unit 124 refers to the write amount management table 112 to see if there is a stream ID whose write data amount has exceeded a predetermined limit. If such a stream ID exists, the GC control unit 124 causes garbage collection to be implemented on data with the stream ID appended thereto.

Next described is processing carried out by the FPGA 106 with reference to flowcharts. The following describes data write control on the SSD 201, as an example. Assume that the available user capacity (the capacity of the logical storage space) of the SSD 201 is 400 GB. Assume further that three step values of "1", "2", and "3" are set as stream IDs and assigned in the stated order to unit regions with a larger number of writes.

Figure 8:
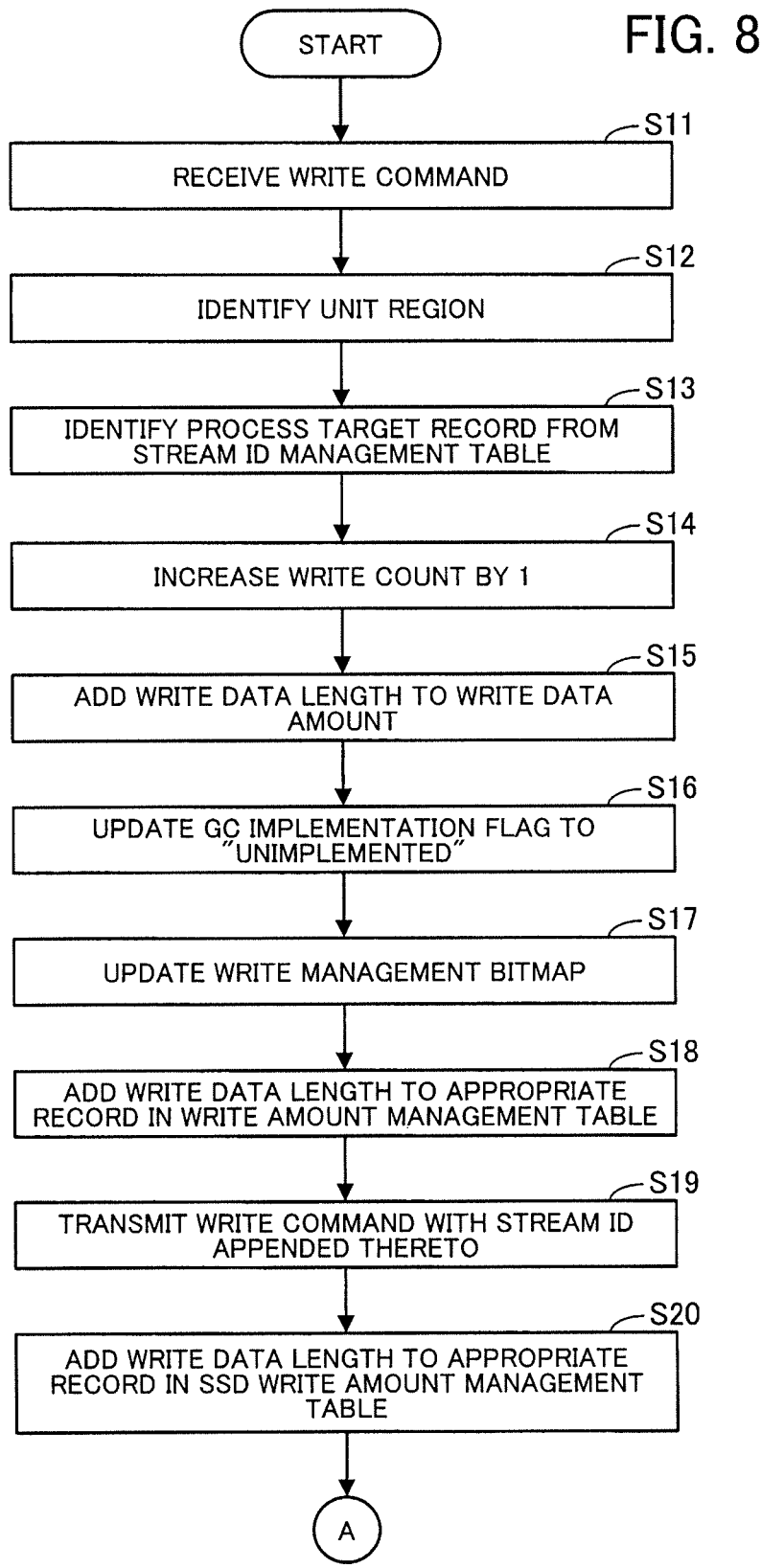
FIG. 8 is a first flowchart illustrating an example of processing procedure carried out by an FPGA in response to a data write request.
Figure 9:
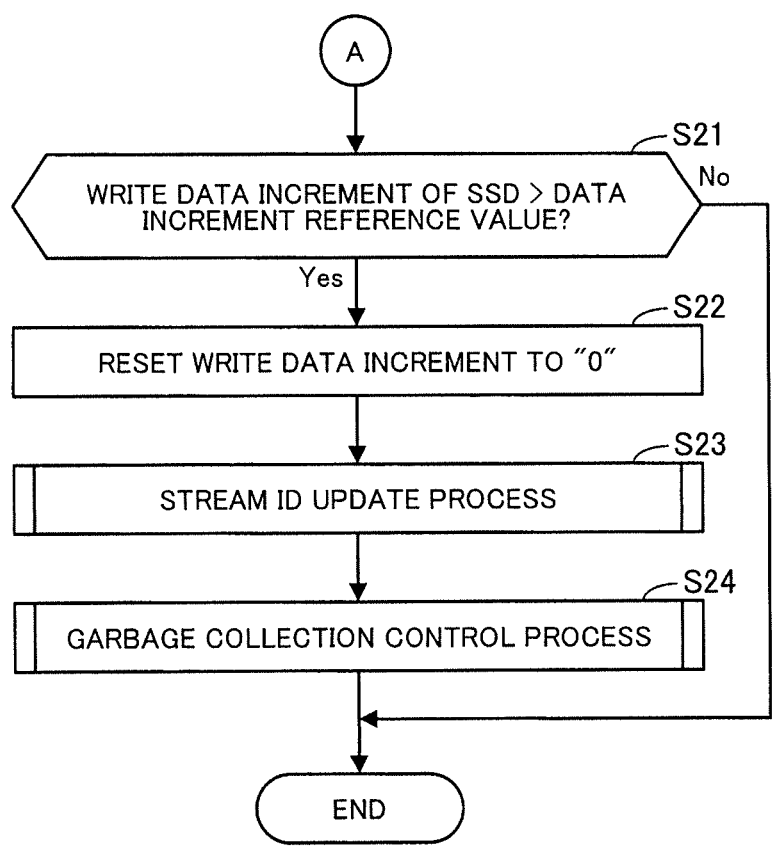
FIG. 9 is a second flowchart illustrating the example of the processing procedure carried out by the FPGA in response to a data write request.

First, FIGS. 8 and 9 are flowcharts illustrating an example of processing procedure carried out by the FPGA in response to a data write request.

[Step S11] The host IO control unit 101a receives a data write request for a logical volume from the host device 300. According to the received write request, the host IO control unit 101a requests the IOC 105 to issue a write command for the SSD 201. At this time, the host IO control unit 101a also informs the IOC 105 about an LUN and LBA designated by the host device 300 as a write destination. The IOC 105 creates a write command including a logical address on the write-destination SSD and the data length of write data and passes the created write command to the FPGA 106 together with the informed LUN and LBA. The command reception processing unit 121 receives the write command together with the LUN and LBA.

[Step S12] Based on the received information, the command reception processing unit 121 identifies a write-destination unit region. Specifically, the command reception processing unit 121 identifies a logical volume identified by the received LUN.

[Step S13] The command reception processing unit 121 refers to the stream ID management table 111 corresponding to the SSD 201 to identify a process target record. Specifically, the command reception processing unit 121 identifies, as the process target, a record having a unit region ID indicating the identified unit region and "current ID" under the item "ID status".

Note however that, if this is the first time that a write to the identified unit region is requested, no record with a unit region ID indicating the unit region exists in the stream ID management table 111 at this point of time. In this case, the command reception processing unit 121 adds a new record to the stream ID management table 111. The stream ID setting unit 123 registers, within the added record, a value indicating the identified unit region under the item "unit region ID" and "0" under both the items "write data amount" and "write count". The stream ID setting unit 123 also registers "unimplemented" under the item "GC implementation flag", "current ID" under the item "ID status", and bitmap data with bit values being all 0's under the item "write management bitmap".

The command reception processing unit 121 also sets a predetermined value under the item "stream ID". Assume that an initial value of "0", different from the normally set stream IDs "1" to "3", is registered according to the second embodiment.

Further, in the case where no record with "0" registered under the item "stream ID" exists in the write amount management table 112 corresponding to the SSD 201, the command reception processing unit 121 adds one record to the write amount management table 112 and registers, in the added record, "0" under both the items "stream ID" and "write data amount".

Note that, in all steps from this point forward, the stream ID management table 111 referred to by the FPGA 106 is the one corresponding to the SSD 201.

[Step S14] The command reception processing unit 121 increases, by 1, the count value registered under the item "write count" of the process target record.

[Step S15] The command reception processing unit 121 adds the data length of the write data included in the write command to the amount registered under the item "write data amount" of the process target record.

[Step S16] If "implemented", which indicates that garbage collection has been performed, is registered under the item "GC implementation flag" of the process target record, the command reception processing unit 121 updates the GC implementation flag to "unimplemented", which indicates that garbage collection has not been performed.

[Step S17] If, amongst the bits registered under the item "write management bitmap" of the process target record, a bit corresponding to the LBA received in step S11 has a value of "0", the command reception processing unit 121 updates the value with "1".

[Step S18] The command reception processing unit 121 acquires the stream ID from the process target record. The command reception processing unit 121 refers to the write amount management table 112 corresponding to the SSD 201, and adds the data length of the write data included in the write command to the amount registered under the item "write data amount" of a record corresponding to the acquired stream ID.

[Step S19] The command transmission processing unit 122 appends the stream ID acquired in step S18 to the write command received in step S11, and then passes the write commands to the IOC 105 to request transmission of the write command. In response to the request, the IOC 105 transmits the write command with the stream ID appended thereto to the SSD 201.

[Step S20] The command reception processing unit 121 refers to the SSD write amount management table 113 and adds the data length of the write data included in the write command to the amount registered under the item "write data increment" of a record corresponding to the SSD 201.

With reference to FIG. 9, the following continues the description of the processing procedure carried out by the FPGA 106.

[Step S21] The command reception processing unit 121 determines whether the write data increment of the SSD 201, updated in step S20, has exceeded a predetermined data increment reference value. In the case where the available user capacity of the SSD 201 is 400 GB, the data increment reference value is set to, for example, 100 GB. When the write data increment has exceeded the data increment reference value, the command reception processing unit 121 moves to step S22. When the write data increment is equal to or below the data increment reference value, on the other hand, the command reception processing unit 121 ends the processing procedure.

[Step S22] The command reception processing unit 121 resets the write data increment updated in step S20 to "0". Herewith, each time the cumulative amount of write data in the SSD 201 increases by the amount corresponding to the data increment reference value, the subsequent steps S23 and S24 are performed.

[Step S23] The stream ID setting unit 123 executes a stream ID update process for updating stream ID assignments to individual unit regions on an as-needed basis. Details of this step are described in FIG. 10.

[Step S24] The GC control unit 124 executes a garbage collection control process for causing the SSD 201 to implement garbage collection on an as-needed basis. Details of this step are described in FIGS. 11 and 12.

Figure 10:
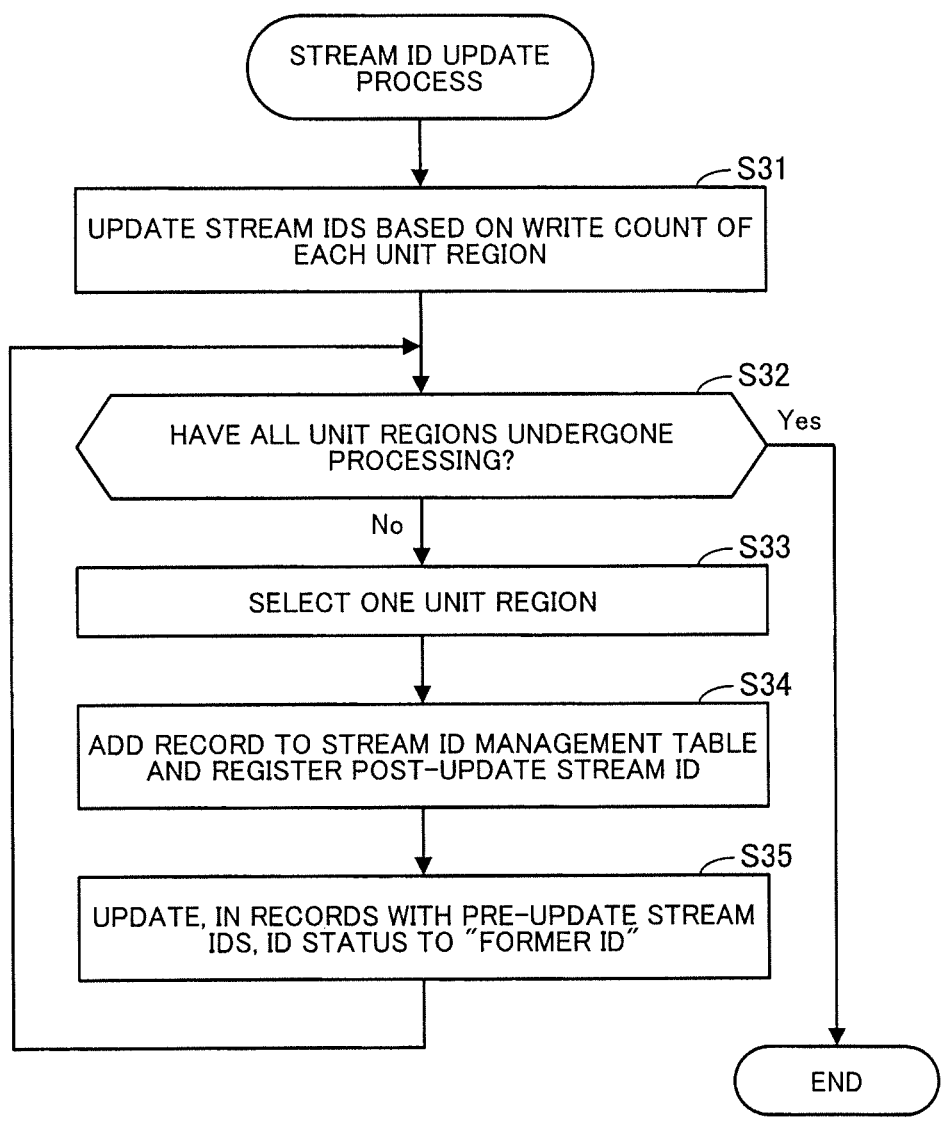
FIG. 10 is a flowchart illustrating a procedure example of a stream ID update process.

FIG. 10 is a flowchart illustrating a procedure example of the stream ID update process. The process of FIG. 10 corresponds to step S23 of FIG. 9.

[Step S31] The stream ID setting unit 123 identifies, amongst records listed in the stream ID management table 111, records with "current ID" registered under the "status ID". Based on the write counts of individual unit regions, registered in the identified records, the stream ID setting unit 123 updates stream ID assignments to the individual unit regions.

For example, the stream ID setting unit 123 sorts the unit regions in descending order of the write count registered in each of the records. The stream ID setting unit 123 assigns stream IDs to the sorted unit regions, starting from the top in the sorted order, in such a manner that each stream ID is assigned to the same number of unit regions.

Specifically, assume for example that three step values of "1", "2", and "3" are set as stream IDs and assigned in the stated order to unit regions with a larger number of writes. Assume also that there are six unit regions a to f. In this case, each stream ID is assigned to two unit regions. The stream ID setting unit 123 sorts the unit regions a to f in descending order of their write counts. Assume for example that the unit regions a to f are sorted to be in the following order: the unit regions a, b, c, d, e, and f. The stream ID setting unit 123 assigns the stream ID "1" to the unit regions a and b; the stream ID "2" to the unit regions c and d; and the stream ID "3" to the unit regions e and f.

Note that the write count registered in each record represents the number of writes made to the corresponding unit region since the latest stream ID update. In the second embodiment, each value under the item "write count" is used as a value approximating a data update frequency of the corresponding unit region.

[Step S32] The stream ID setting unit 123 determines whether all the unit regions have undergone steps S33 to S35. If there are one or more unit regions that have yet to undergo the above-cited operational steps, the stream ID setting unit 123 moves to step S33. If all the unit regions have undergone the steps, on the other hand, the stream ID setting unit 123 ends the process. In this case, the garbage collection control process depicted in FIG. 11 below is then executed.

[Step S33] The stream ID setting unit 123 selects one unit region which has yet to undergo steps S33 to S35.

[Step S34] The stream ID setting unit 123 adds a new record to the stream ID management table 111. The stream ID setting unit 123 registers, in the added record, a value indicating the unit region selected in step S33 under the item "unit region ID" and a post-update stream ID assigned in step S31 for the unit region under the "stream ID". Further, the stream ID setting unit 123 registers "0" under both the items "write data amount" and "write count"; "unimplemented" under the item "GC implementation flag"; and "current ID" under the item "ID status". The stream ID setting unit 123 also registers bitmap data with bit values being all 0's under the item "write management bitmap".

Step S34 allows, when a write to the unit region is subsequently requested, the post-update stream ID corresponding to the unit region to be appended to the write command.

[Step S35] The stream ID setting unit 123 registers, in records with pre-update stream IDs, that is, the records identified in step S31, "former ID" under the item "ID status". After this, the stream ID setting unit 123 returns to step S32.

The above-described process of FIG. 10 is executed each time the cumulative amount of write data in the SSD 201 increases by the amount corresponding to the data increment reference value. Then, in each case, stream ID assignments to individual unit regions are reviewed based on the write counts of the individual unit regions, obtained since the latest stream ID update.

At the point of time when the process of FIG. 10 is executed, the post-update stream IDs are only registered in the stream ID management table 111 and are not reflected in data stored in the SSD 201. When a write to a unit region is subsequently requested and a write command is then transmitted to the SSD 201, a corresponding post-update stream ID is appended to the write command (step S19 of FIG. 8). Thus, as data writes to unit regions are continued after the stream ID update, the post-update stream IDs are progressively reflected in the data on the SSD 201. Herewith, appropriate write data sorting into destination blocks on the SSD 201 according to changes in the write frequency of each unit region is increasingly achieved.

Figure 11:
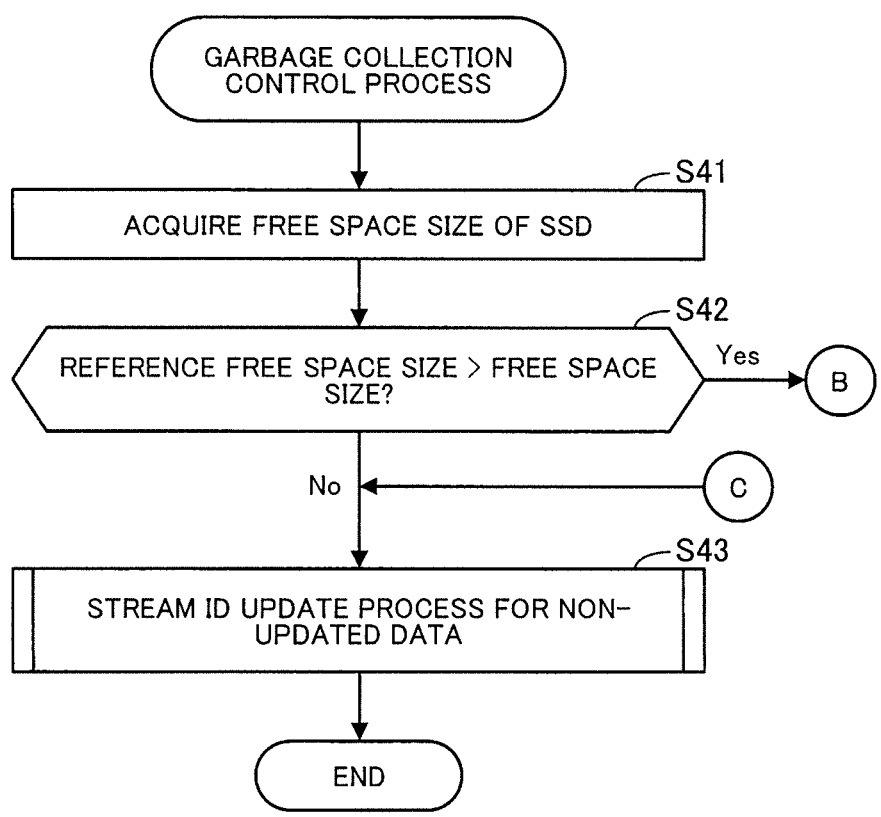
FIG. 11 is a first flowchart illustrating a procedure example of a garbage collection control process.
Figure 12:
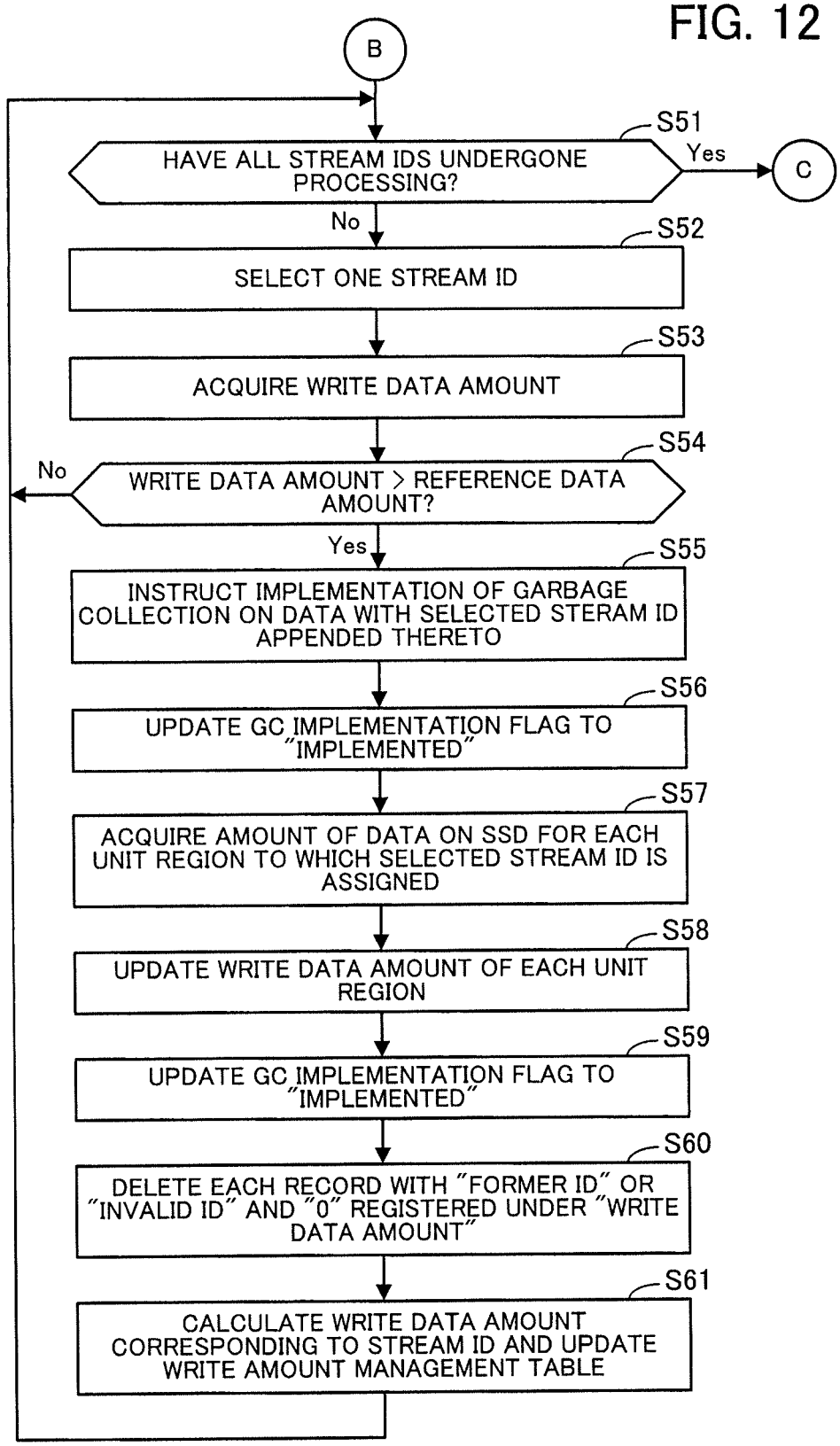
FIG. 12 is a second flowchart illustrating the procedure example of the garbage collection control process.

FIGS. 11 and 12 are flowcharts illustrating a procedure example of the garbage collection control process. The process of FIGS. 11 and 12 corresponds to step S24 of FIG. 9.

[Step S41] The GC control unit 124 acquires the free space size in the physical storage space on the SSD 201. Specifically, the GC control unit 124 transmits, to the SSD 201 via the IOC 105, a control command for requesting transmission of the free space size and receives the free space size returned from the SSD 201.

[Step S42] The GC control unit 124 determines whether the acquired free space size is smaller than a predetermined reference free space size. If the free space size is smaller than the reference free space size, the GC control unit 124 moves to step S51 of FIG. 12. If the free space size is equal to or larger than the reference free space size, on the other hand, the GC control unit 124 moves to step S43.

Step S42 is performed when the write data increment of the SSD 201 has increased by the amount corresponding to the data increment reference value (for example, 100 GB) in step S21 of FIG. 9. Therefore, the reference free space size needs to be at least larger than the data increment reference value. For example, the reference free space size is set to a value greater than the data increment reference value but less than twice the data increment reference value. Assume in the second embodiment that the reference free space size is 150 GB.

A controller of the SSD 201 implements garbage collection when the free space size in the physical storage space on the SSD 201 has decreased to or below a predetermined threshold. On the other hand, the reference free space size is preferably set to a value greater than the threshold for the SSD 201 because it is used to determine whether to cause the SSD 201 to implement garbage collection upon request of the FPGA 106. Herewith, the FPGA 106 side is able to proactively implement garbage collection on blocks for which implementation of garbage collection is supposedly desirable.

Further, the reference free space size may be set based on the proportion of the size of the logical storage space on the SSD 201 to the size of its physical storage space.

[Step S43] The stream ID setting unit 123 executes a stream ID update process for non-updated data. Details of this process are described in FIG. 13.

With reference to FIG. 12, the following continues the description of the garbage collection control process.

[Step S51] The GC control unit 124 determines whether all the stream IDs "0" to "3" have undergone step S52 and the subsequent steps. If there are one or more stream IDs that have yet to undergo the above-cited operational steps, the GC control unit 124 moves to step S52. If all the stream IDs have undergone the steps, on the other hand, the GC control unit 124 moves to step S43 of FIG. 11.

[Step S52] The GC control unit 124 selects one stream ID which has yet to undergo step S52 and the subsequent steps.

[Step S53] The GC control unit 124 acquires, from the write amount management table 112 corresponding to the SSD 201, the write data amount of the stream ID selected in step S52.

[Step S54] The GC control unit 124 determines whether the write data amount acquired in step S53 is larger than a predetermined reference data amount. If the write data amount is greater than the reference data amount, the GC control unit 124 moves to step S55. If the write data amount is equal to or less than the reference data amount, the GC control unit 124 returns to step S51. Note that the reference data amount is set to 100 GB, for example. The reference data amount may be determined according to the available user capacity of the SSD 201 and the number of step values appended as stream IDs.

[Step S55] The GC control unit 124 transmits, to the SSD 201 via the IOC 105, a control command to request implementation of garbage collection on data to which the stream ID selected in step S52 is appended.

The SSD 201 exercises control in such a manner that write data is written to a different block according to a stream ID appended thereto. In the case where a "Yes" is obtained in step S54, a large amount of data to which the stream ID selected in step S52 is appended, including valid data and invalid data, has been written to the SSD 201. In addition, a block on the SSD 201 is likely to be nearly filled up to capacity with data to which the stream ID selected in step S52 is appended.

Under this condition, when the control command is transmitted in step S55, the SSD 201 implements, according to the received control command, garbage collection on a block to which data with the designated stream ID appended thereto has been written. This gathers, amongst the data to which the designated stream ID is appended, only valid data to a different block, thereby increasing free space on the SSD 201.

[Step S56] The GC control unit 124 identifies, amongst records listed in the stream ID management table 111, records with the stream ID selected in step S52 registered under the item "stream ID". The records identified at this point include both records with "current ID" and those with "former ID" registered under the item "ID status". The GC control unit 124 updates the GC implementation flag of each of the identified records to "implemented".

[Step S57] The GC control unit 124 acquires, for each unit region to which the stream ID selected in step S52 is assigned, the amount of valid data written to the SSD 201. Specifically, the GC control unit 124 performs the following processing on each of the records identified in step S56.

The GC control unit 124 identifies, from the write management bitmap, bits with a value of "1", which indicates that data has been written to the corresponding location. Referring to the unit region setting table 114, the GC control unit 124 identifies a logical address on the SSD 201, corresponding to each of the identified bits. The GC control unit 124 transmits, to the SSD 201 via the IOC 105, control commands each designating one of the identified logical addresses and the stream ID selected in step S52. Each of these control commands is used to make an inquiry to see if data with the stream ID appended thereto, requested to be written to the corresponding logical address, remains on the SSD 201 as valid data.

The GC control unit 124 acquires, from responses to the control commands, the amount of valid data corresponding to the unit region ID and the stream ID registered in each of the records identified in step S56.

Note that in step S57, as for records with the ID status being "former ID", the amount of valid data may be "0" due to implementation of garbage collection. This means that all data with the pre-update stream ID appended thereto amongst data written to a unit region is invalidated by the implementation of garbage collection, and then deleted from the SSD 201.

[Step S58] For each of the records identified in step S56, the GC control unit 124 updates the registered write data amount with the valid data amount acquired in the step S57.

[Step S59] For each of the records identified in step S56, the GC control unit 124 updates the GC implementation flag to "implemented".

[Step S60] The GC control unit 124 first identifies, amongst the records identified in step S56, each record with "former ID" or "invalid ID" registered under the item "ID status" and "0" registered under the item "write data amount". The GC control unit 124 subsequently identifies each record having the same unit region ID as one of the first identified records and "current ID" registered under the item "ID status". The GC control unit 124 merges the write management bitmap registered in the first identified record and that registered in the subsequently identified record by calculating the OR of the two. The GC control unit 124 updates the write management bitmap registered in the subsequently identified record with the merged bitmap. Then, the GC control unit 124 deletes the first identified record from the stream ID management table 111.

[Step S61] The GC control unit 124 calculates the write data amount on the SSD 201, corresponding to the stream ID selected in step S52. Precisely speaking, the write data amount represents the total amount of valid data amongst data on the SSD 201, with the stream ID selected in step S52 appended thereto. Specifically, the GC control unit 124 acquires the write data amounts of the individual unit regions, updated in step S58, and adds up the write data amounts to thereby calculate the write data amount on the SSD 201, corresponding to the stream ID. The GC control unit 124 refers to the write amount management table 112 corresponding to the SSD 201 and updates the write data amount registered in a record corresponding to the stream ID selected in step S52 with the calculated write data amount.

After this, the GC control unit 124 returns to step S51.

According to the process depicted in FIGS. 11 and 12 above, it is possible to cause the SSD 201 to proactively implement garbage collection based on the judgment of the FPGA 106 side in addition to garbage collection implemented based on the judgment of the SSD 201 side. The GC control unit 124 of the FPGA 106 manages the write data amount for each stream ID and uses results of the management to properly determine each stream ID to be targeted for garbage collection. This gives increased processing efficiency of garbage collection on the SSD 201. In addition, it is possible to reduce the number of implementations of garbage collection based on the judgment of the SSD 201 side. The above-described process is likely to reduce the number of implementations of garbage collection for the entire SSD 201, compared to the case where garbage collection is implemented based on the judgment of the SSD 201 side only. In that case, there is a strong possibility of further reducing the amount of data writes involved in garbage collection.

Figure 13:
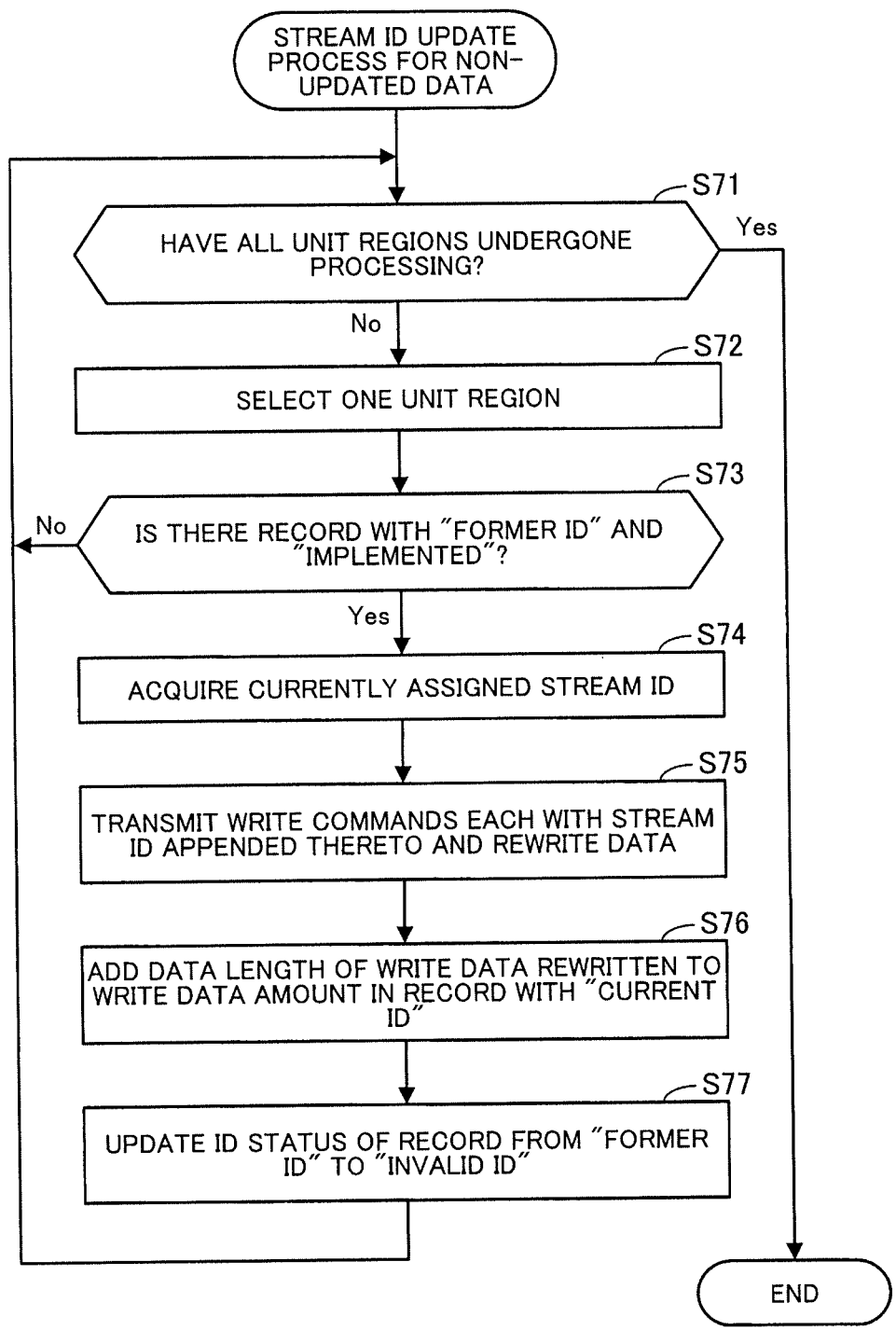
FIG. 13 is a flowchart illustrating a procedure example of a stream ID update process for non-updated data.

FIG. 13 is a flowchart illustrating a procedure example of the stream ID update process for non-updated data.

[Step S71] The stream ID setting unit 123 determines whether all unit regions have undergone step S72 and the subsequent steps. If there are one or more unit regions that have yet to undergo the above-cited operational steps, the stream ID setting unit 123 moves to step S72. If all the unit regions have undergone the steps, on the other hand, the stream ID setting unit 123 ends the process.

[Step S72] The stream ID setting unit 123 selects one unit region which has yet to undergo the above-cited operational steps.

[Step S73] The stream ID setting unit 123 identifies, from the stream ID management table 111, records with the unit region ID of the unit region selected in step S72. The stream ID setting unit 123 determines whether, amongst the identified records, there is a record with "former ID" and "implemented" registered under the items "ID status" and "GC implementation flag", respectively. Note that the record satisfying this determination condition corresponds to a unit region to which a stream ID targeted for the latest garbage collection was assigned as its pre-update stream ID. If there is such a record, the stream ID setting unit 123 moves to step S74. If there is no such a record, on the other hand, the stream ID setting unit 123 returns to step S71.

[Step S74] The stream ID setting unit 123 identifies, amongst records listed in the stream ID management table 111, a record with the unit region ID of the unit region selected in step S72 and "current ID" registered under the item "ID status" and acquires the currently assigned stream ID from the identified record.

[Step S75] The stream ID setting unit 123 identifies each record satisfying the determination condition of step S73 (i.e., a record with "former ID" and "implemented" registered under the items "ID status" and "GC implementation flag", respectively). A record satisfying the determination condition being left means that data written to the SSD 201, with a pre-update stream ID appended thereto, includes data remaining as valid data even after the implementation of the garbage collection of FIG. 12.

In view of this, the stream ID setting unit 123 reads such data from the SSD 201 and appends the currently assigned stream ID acquired in step S74 to the read data and then rewrites the data to the SSD 201. Herewith, the stream ID appended to the valid data on the SSD 201 is replaced with the currently assigned stream ID.

Specifically, the stream ID setting unit 123 identifies, in the write management bitmap corresponding to the identified record, bits with a value of "1", which indicates that data has been written to the corresponding location. The stream ID setting unit 123 refers to the unit region setting table 114 to identify a logical address on the SSD 201 corresponding to each of the identified bits. The stream ID setting unit 123 then performs the following processing on each of the identified logical addresses.

The stream ID setting unit 123 transmits, to the SSD 201 via the IOC 105, a read command with the identified logical address set as a read-source address. Herewith, corresponding data is read from the SSD 201. Subsequently, the stream ID setting unit 123 creates a write command with the same logical address set as a write-destination address. The stream ID setting unit 123 appends the currently assigned stream ID acquired in step S74 to the write command and then transmits the write command to the SSD 201 via the IOC 105.

This invalidates, amongst data corresponding to the same logical addresses on the SSD 201, write data with the pre-update stream ID appended thereto. Then, the data requested to be newly written with the currently assigned stream ID appended thereto is written to a different block on the SSD 201 as valid data.

[Step S76] The stream ID setting unit 123 adds the data length of the write data rewritten in step S75 (that is, the total amount of data rewritten) to the write data amount registered in the record from which the currently assigned stream ID is acquired in step S74.

Further, the stream ID setting unit 123 merges the write management bitmap registered in the record for which the addition of the write data amount has been made and the write management bitmap registered in the record identified in step S75 by calculating the OR of the two. The stream ID setting unit 123 updates, with the merged bitmap, the write management bitmap registered in the record for which the addition of the write data amount has been made.

[Step S77] The stream ID setting unit 123 updates the ID status of each record identified in step S75 from "former ID" to "invalid ID". Subsequently, the stream ID setting unit 123 returns to step S71.

Next described is a specific example of write control to the SSD 201.

Figure 15:
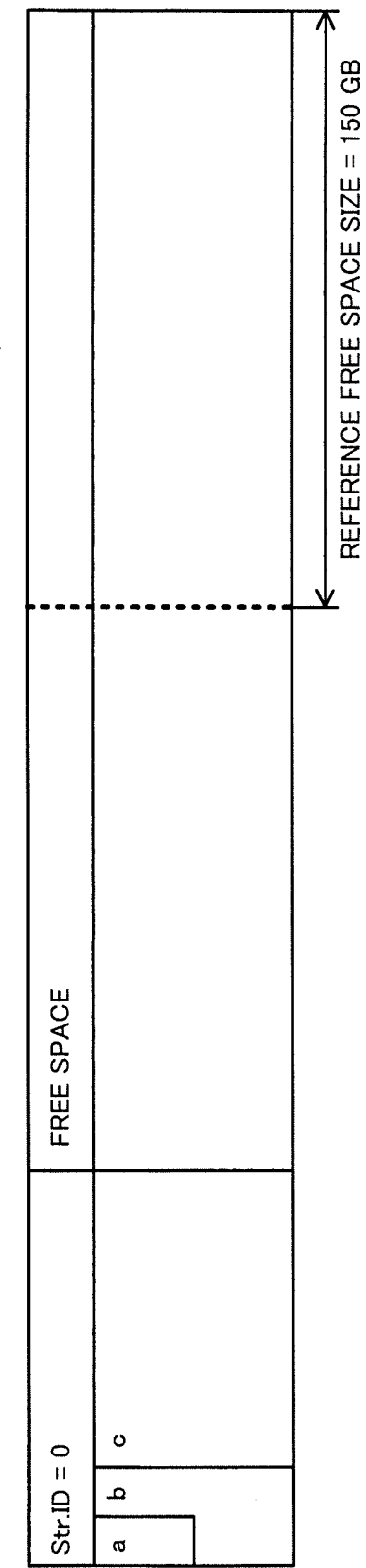
FIG. 15 illustrates an example of a conceptual image of physical storage space on the SSD in the first state.

FIG. 14 illustrates an example of data registered in the management tables in a first state. FIG. 15 illustrates an example of a conceptual image of physical storage space on the SSD in the first state.

When a write to a unit region starts from an initial state where no data writes to the SSD 201 have taken place, the stream ID update process is not executed until the write data increment in the SSD 201 exceeds the data increment reference value (100 GB). The first state represents a condition where the write data increment in the SSD 201 has yet to exceed the data increment reference value although data writes to unit regions a, b, and c has been made following the initial state.

In this state, records each corresponding to one of the unit regions a, b, and c are registered in the stream ID management table 111, as illustrated in FIG. 14. Each of the unit regions a, b, and c is assigned an initial value of "0" as its stream ID. Then, for each data write, numerical increases are observed under the items "write data amount" and "write count" in the stream ID management table 111; the item "write data amount" in the write amount management table 112; and the item "write data increment" in the SSD write amount management table 113.

Note that the item "write management bitmap" is not illustrated in the stream ID management table 111 of FIG.

14. In addition, assume that "1" registered under the item "SSD ID" in the SSD write amount management table 113 represents the SSD 201.

In the SSD 201, data belonging to the unit regions a, b, and c is sequentially stored, as illustrated in FIG. 15. In this state, the size of free space in the physical storage space on the SSD 201 is much larger than the reference free space size (150 GB) used to determine whether to request implementation of garbage collection.

Assume next that data writes to the unit regions a, b, and c are continued from the above-described first state and the write data increment in the SSD 201 then exceeds the data increment reference value (100 GB). This state is referred to as a second state.

FIG. 16 illustrates an example of data registered in the management tables in the second state. In the second state, the stream ID update process of FIG. 10 is executed. Assume that 6 GB data, 14 GB data, and 80 GB data have been written to the unit regions a, b, and c, respectively, before a transition to the second state takes place.

In this case, the unit regions a, b, and c are assigned the stream IDs "1", "2", and "3", respectively, in step S31 of FIG. 10. In addition, new records 111a, 111b, and 111c corresponding to the unit regions a, b, and c, respectively, are added to the stream ID management table 111. In each of the added records 111a, 111b, and 111c, its corresponding newly assigned, post-update stream ID is registered under the item "stream ID" and "current ID" is registered under the item "ID status". On the other hand, in each of records 111d, 111e, and 111f with the pre-update stream IDs registered under the item "stream ID", "current ID" under the item "ID status" is updated with "former ID". Note that, in the SSD write amount management table 113, the amount under the item "write data increment", corresponding to the SSD 201, is reset to "0".

Continuing data writes to the unit regions a, b, and c from the above-described second state allows, in transmitting each write command to the SSD 201, a post-update stream ID to be appended to the write command. Herewith, in each new data write, a stream ID assigned according to the update frequency of each of the unit regions a, b, and c immediately before the execution of the stream ID update process is appended to the data. As a result, data belonging to a unit region having a different update frequency is written to a separate block on the SSD 201

Assume that data writes to unit regions d and e, in addition to the unit regions a, b, and c, are made from the second state. Assume also that, with the data writes being made, the write data increment in the SSD 201 has exceeded the data increment reference value (100 GB) and the stream ID update process is then executed again.

Assume that data writes are further continued and data pieces each with a post-update stream ID attached thereto are gradually written to the SSD 201. This state is referred to as a third state.

FIG. 17 illustrates an example of data registered in the management tables in the third state. Assume that, because of the execution of the stream ID update process, new stream ID assignments are made as follows: the unit regions c and d are assigned the stream ID "3"; the unit regions b and e are assigned the stream ID "2"; and the unit region a is assigned the stream ID "1", as illustrated in FIG. 17.

In this case, new records 111g, 111h, 111i, 111j, and 111k corresponding to the unit regions c, d, b, e, and a, respectively, are added to the stream ID management table 111. In each of the added records 111g, 111h, 111i, 111j, and 111k, its corresponding newly assigned, post-update stream ID is registered under the item "stream ID". In addition, in each of records 111l to 111p with the pre-update stream IDs, "current ID" under the item "ID status" is updated with "former ID".

Assume that, subsequently, data writes to the unit regions a to e are continued and a transition to the third state takes place. Assume also that, in the third state, the size of free space on the SSD 201 is determined to have fallen below the reference free space size (150 GB) by the determination processing in step S42 of FIG. 11. In this case, garbage collection is implemented on data pieces written to a unit region with at least one stream ID assigned thereto.

In the example of the write amount management table 112 of FIG. 17, each of the write data amounts corresponding to the stream IDs "0" and "3" has exceeded the reference data amount (100 GB). In this case, the stream IDs "0" and "3" are targeted for garbage collection. In the following, a state after the implementation of garbage collection is referred to as a fourth state.

FIG. 18 illustrates an example of data registered in the management tables in the fourth state. Because of the implementation of garbage collection, the write data amounts in the records 111g and 111h, i.e., the amounts of data with the stream ID "3" appended thereto have been reduced. According to the second embodiment, the write data amount is managed for each stream ID using the write amount management table 112, and garbage collection is implemented by designating each stream ID whose write data amount has exceeded a predetermined value. This enhances the effect of invalid data reduction due to the implementation of garbage collection. In addition, implementing garbage collection under the above-described conditions raises the possibility of allowing data belonging to a unit region of a high update frequency to be targeted for garbage collection. As a result, it is possible to reduce the data write amount involved in garbage collection.

Note that, in the example of FIG. 18, the write data amount in each of the records 111m to 111p has been updated to "0". This indicates that, amongst data belonging to the unit regions b to e, data with the pre-update stream ID "0" appended thereto has all been deleted from the SSD 201. These records 111m to 111p are deleted from the stream. ID management table 111 in step S60 of FIG. 12.

Figure 19:
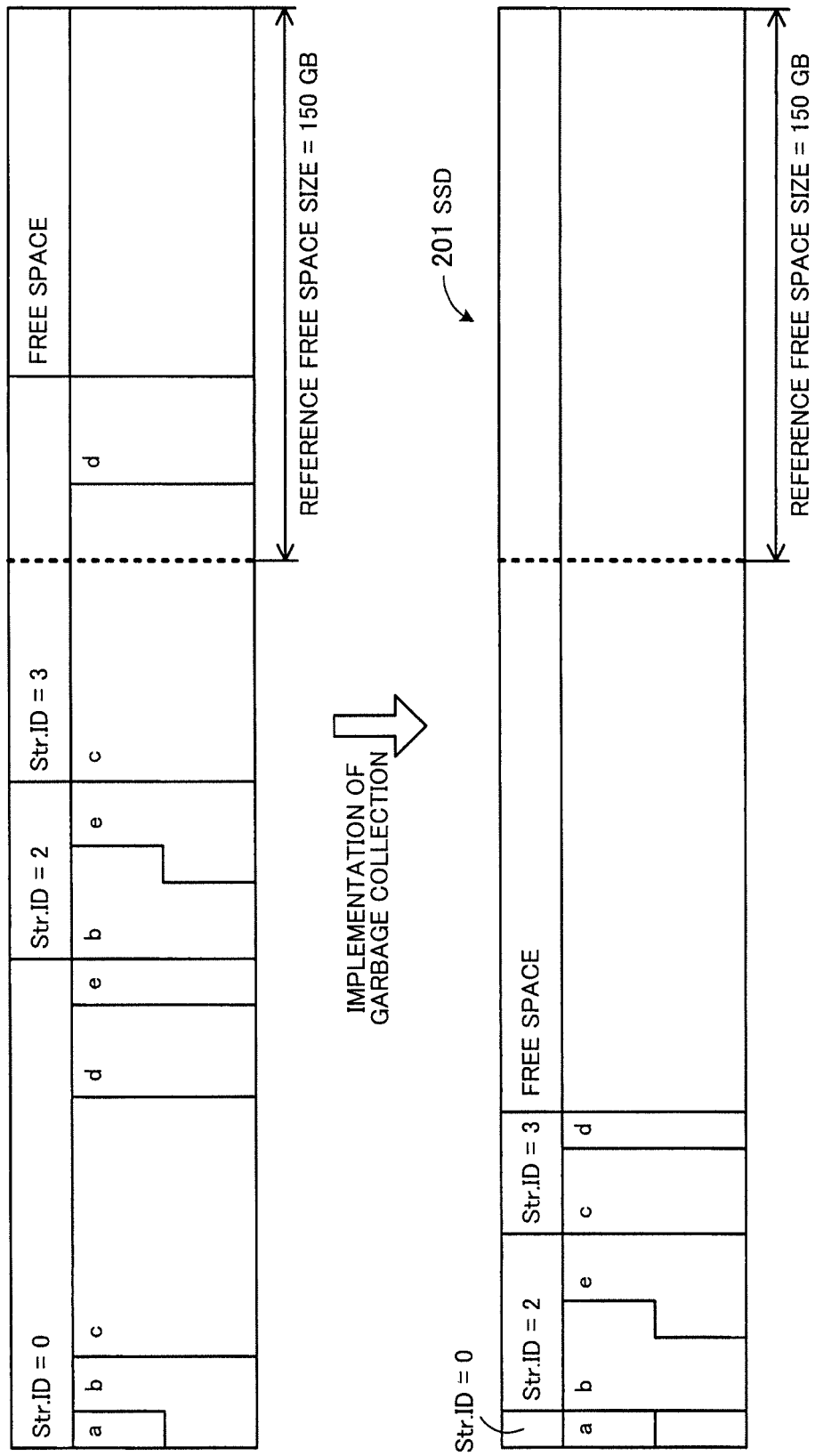
FIG. 19 illustrates an example of conceptual images of the physical storage space on the SSD in the third and fourth states.

FIG. 19 illustrates an example of conceptual images of the physical storage space on the SSD in the third and fourth states. The upper part of FIG. 19 represents the physical storage space on the SSD in the third state while the lower part represents that in the fourth state. In the third state, the amount of free space in the physical storage space on the SSD 201 has fallen below the reference free space size (150 GB), as illustrated in the upper part of FIG. 19. In the fourth state, on the other hand, the amount of data with the stream IDs "0" and "3" appended thereto has been reduced due to the implementation of garbage collection, as illustrated in the lower part of FIG. 19. As a result, the amount of free space in the physical storage space on the SSD 201 has been recovered considerably to be much larger than the reference free space size.

Note that, in the third state, the record 111k corresponding to the unit region a includes "0" under the item "write data amount", as illustrated in FIG. 17. This indicates that no write to the unit region a has taken place after the latest stream ID update process. In this case, only data with the pre-update stream ID "0" appended thereto is written to the SSD 201 as data belonging to the unit region a, as illustrated in the lower part of FIG. 19. Because the data assuredly includes valid data, the valid data with the stream ID "0"

appended thereto still remains on the SSD 201 even after implementation of garbage collection targeted for the stream ID "0".

In the case where valid data with a pre-update stream ID appended thereto remains as just described, the stream ID update process for non-updated data illustrated in FIG. 13 is performed, in which the valid data is read, and then rewritten to the SSD 201 together with a post-update stream ID appended thereto. Herewith, the valid data with the pre-update stream ID appended thereto is deleted from the SSD 201, and the same valid data with the post-update stream ID appended thereto is stored in the SSD 201.

FIG. 20 illustrates an example of data registered in the management tables in a fifth state. In addition, FIG. 21 illustrates an example of a conceptual image of the physical storage space on the SSD in the fifth state.

In the above-described fourth state, the record 111*l* corresponding to the unit region a and including "implemented" under the item "GC implementation flag" and "former ID" under the item "ID status" is the target of the stream ID update process for non-updated data. In this process, amongst data belonging to the unit region a, data of 5 GB with the pre-update stream ID "0" appended thereto is read from the SSD 201. Then, the read data is rewritten to the SSD 201 together with the post-update stream ID "1" appended thereto. As a result, while the write data amount of the record 111*k* increases by 5 GB, the ID status of the record 111*l* is updated to "invalid ID", thus recording that the data with the stream ID "0" appended thereto has been rendered invalid.

Figure 21:
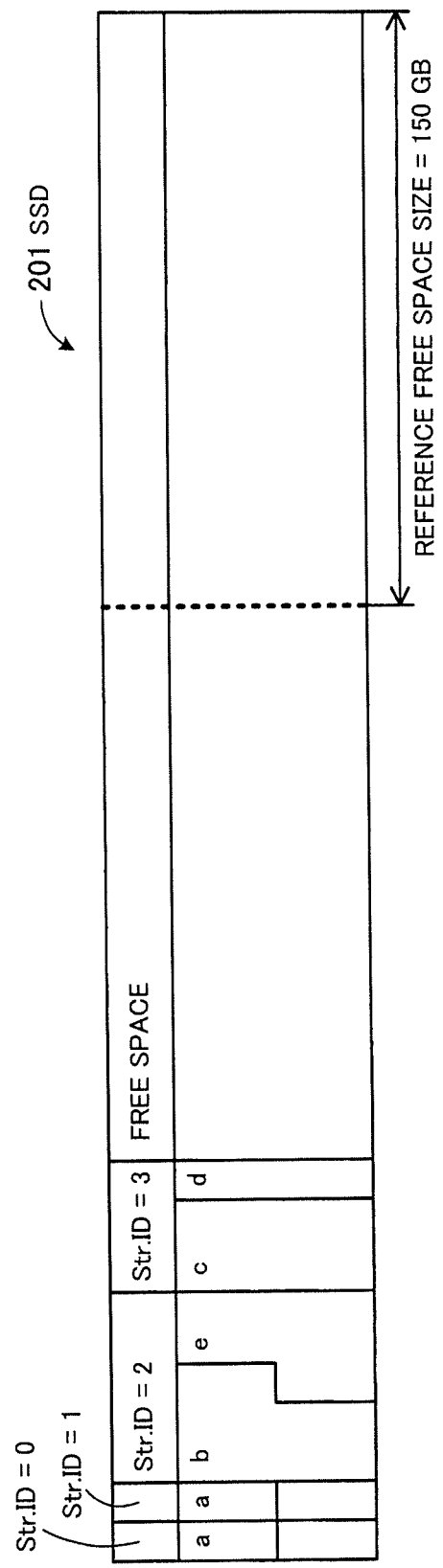
FIG. 21 illustrates an example of a conceptual image of the physical storage space on the SSD in the fifth state.

In the fifth state, data belonging to the unit region a, with the stream ID "1" appended thereto, is additionally written to the SSD 201, as illustrated in FIG. 21. This decreases the amount of free space on the SSD 201. However, because data belonging to the unit region a, with the stream ID "0" appended thereto, is all invalid data, a block to which the invalid data is written will be flushed at some stage at the discretion of the controller of the SSD 201 and become available again.

(c) Third Embodiment

A controller module according to a third embodiment is configured by modifying the controller module 100 of the second embodiment in such a manner that the processing of the FPGA 106 is performed by the CPU 101. The following description focuses on differences from the above-described second embodiment. Note that like components to the second embodiment are denoted by like reference numerals.

Figure 22:
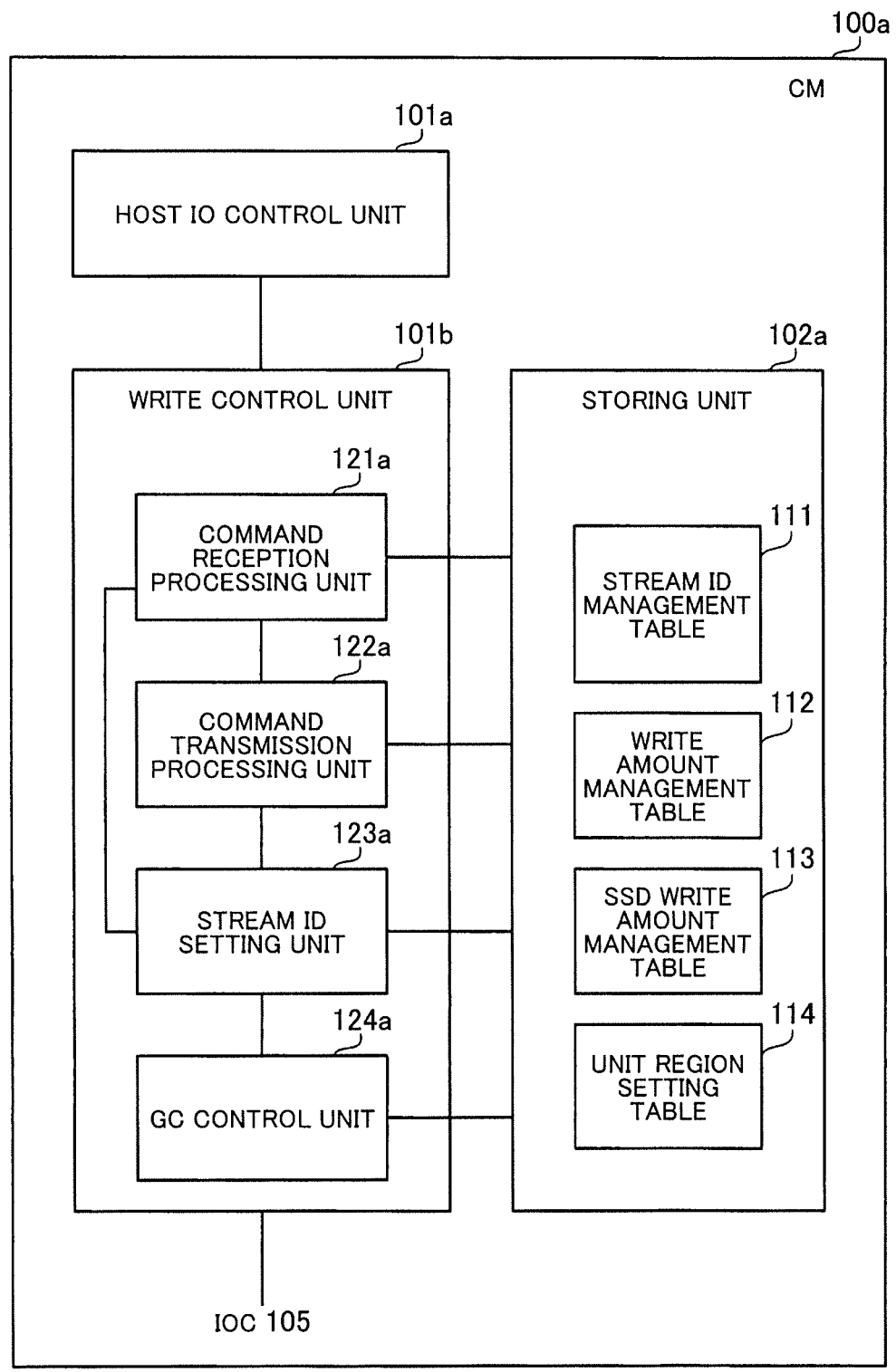
FIG. 22 is a block diagram illustrating a configuration example of processing functions of a controller module according to a third embodiment.

FIG. 22 is a block diagram illustrating a configuration example of processing functions of the controller module according to the third embodiment.

A storage device according to the third embodiment includes a controller module 100*a* in place of the controller module 100. The controller module 100*a* includes a storing unit 102*a* and a write control unit 101*b* in addition to the host IO control unit 101*a*.

The storing unit 102*a* is implemented using a part of the storage space on the RAM 102 or the SSD 103, for example. The storing unit 102*a* stores therein the stream ID management table 111, the write amount management table 112, the SSD write amount management table 113, and the unit region setting table 114, as is the case with the storing unit 110 of the second embodiment.

Processing of the write control unit 101*b* is implemented, for example, by the CPU 101 executing a predetermined application program, as is the case with the host IO control unit 101*a*.

When the host IO control unit 101*a* outputs a request for issuance of a read command to the IOC 105, the write control unit 101*b* transfers the issuance request straight to the IOC 105. On the other hand, when the host IO control unit 101*a* outputs a request for issuance of a write command to the IOC 105, the write control unit 101*b* acquires the issuance request rather than transferring it straight to the IOC 105. Note that, when acquiring the write command issuance request, the write control unit 101*b* also receives a notice of an LUN and LBA.

The write control unit 101*b* includes a command reception processing unit 121*a*, a command transmission processing unit 122*a*, a stream ID setting unit 123*a*, and a GC control unit 124*a*. Basic processes of the command reception processing unit 121*a*, the command transmission processing unit 122*a*, the stream ID setting unit 123*a*, and the GC control unit 124*a* are the same as those of the command reception processing unit 121, the command transmission processing unit 122, the stream ID setting unit 123, and the GC control unit 124, respectively. Note however that the command reception processing unit 121*a* differs from the command reception processing unit 121 in acquiring a write command issuance request output from the host IO control unit 101*a* together with an LUN and LBA. The command transmission processing unit 122*a* differs from the command transmission processing unit 122 in requesting the IOC 105 to issue a write command with a stream ID appended thereto.

The stream ID setting unit 123*a* differs from the stream ID setting unit 123 in requesting, in step S75 of FIG. 13, the IOC 105 to issue a command to read or write (rewrite) data from or to an SSD. The GC control unit 124*a* differs from the GC control unit 124 in requesting, in step S57 of FIG. 12, the IOC 105 to issue a control command to request transmission of the amount of valid data corresponding to the selected stream ID.

The controller module 100*a* according to the third embodiment above achieves the same effect as the second embodiment.

Note that the processing functions of each of the apparatuses described in the embodiments above (for example, the storage control device 10 and the controller modules 100 and 100*a*) may be achieved by a computer. In this case, a program is made available in which processing details of the functions to be provided to each of the above-described apparatuses are described. By executing the program on the computer, the above-described processing functions are achieved on the computer. The program in which processing details are described may be recorded in a computer-readable storage medium. Such computer-readable storage media include a magnetic storage device, an optical disk, a magneto-optical storage medium, and a semiconductor memory. Examples of the magnetic storage device are a hard disk drive (HDD), a flexible disk (FD), and a magnetic tape. Examples of the optical disk are a digital versatile disc (DVD), a DVD-RAM, a compact disc-read only memory (CD-ROM), a CD-recordable (CD-R), and a CD-rewritable (CD-RW). An example of the magneto-optical storage medium is a magneto-optical disk (MO).

In the case of distributing the program, for example, portable storage media, such as DVDs and CD-ROMs, in which the program is recorded are sold. In addition, the program may be stored in a storage device of a server computer and then transferred from the server computer to another computer via a network.

A computer for executing the program stores the program, which is originally recorded in a portable storage medium or transferred from the server computer, in its own storage device. Subsequently, the computer reads the program from the storage device and performs processing according to the program. Note that the computer is able to read the program directly from the portable storage medium and perform processing according to the program. In addition, the computer is able to sequentially perform processing according to a received program each time such a program is transferred from the server computer connected via a network.

According to one aspect, it is possible to reduce the number of writes on a storage apparatus.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A storage control apparatus comprising:
a memory that stores mapping management information indicating mappings between each of a plurality of divided regions created by dividing logical storage space on a storage apparatus and one of a plurality of identification numbers each representing a different write frequency; and
a processor that executes a process including:
identifying, upon request for a data write to a write address included in any of the plurality of divided regions, an identification number associated with a divided region including the write address amongst the plurality of identification numbers based on the mapping management information, appending the identified identification number to a first write request for the write address, and transmitting the first write request with the identified identification number appended thereto to the storage apparatus,
measuring a write frequency of each of the plurality of divided regions,
updating the mappings indicated by the mapping management information based on results of the measuring, the updating including associating, when the plurality of identification numbers is smaller in number than the plurality of divided regions, at least one of the plurality of identification numbers with two or more of the plurality of divided regions, and
identifying, upon request for a data write to the write address after the updating, an identification number associated with the divided region including the write address amongst the plurality of identification numbers based on the mapping management information, appending the identified identification number to a second write request for the write address, and transmitting the second write request with the identified identification number appended thereto to the storage apparatus.

2. The storage control apparatus according to claim 1, wherein: the plurality of identification numbers is information used to control the storage apparatus to write write data to a different one of a plurality of management regions according to an identification number appended to the write data, and each of the plurality of management regions is a unit of data deletion, included in physical storage space on the storage apparatus.

3. The storage control apparatus according to claim 1, wherein: the updating is performed each time a cumulative amount of data written to the storage apparatus increases by a predetermined amount.

4. The storage control apparatus according to claim 1, wherein: the process further includes:
acquiring, when an amount of free space in physical storage space on the storage apparatus has fallen below a predetermined amount, a total data amount of data with each of the plurality of identification numbers appended thereto at time of writing amongst data written to the storage apparatus,
identifying, amongst the plurality of identification numbers, a specific identification number whose total data amount exceeds a predetermined reference amount, and
causing the storage apparatus to implement garbage collection on data with the specific identification number appended thereto at time of writing.

5. The storage control apparatus according to claim 4, wherein:
the memory further stores data amount management information which registers a write data amount corresponding to each of the plurality of identification numbers,
the process further includes adding, each time a write request with one of the plurality of identification numbers appended thereto is transmitted to the storage apparatus, a size of data involved in the write request to the write data amount corresponding to the appended identification number, and
the acquiring includes reading, from the data amount management information as the total data amount, the write data amount corresponding to each of the plurality of identification numbers at time of the acquiring.

6. The storage control apparatus according to claim 4, wherein: the process further includes:
identifying, amongst the plurality of divided regions, a specific divided region which is associated with the specific identification number before a latest update of the mappings and for which no write request has been issued after the latest update of the mappings,
identifying, based on the mapping management information, a current identification number currently associated with the specific divided region amongst the plurality of identification numbers, and
reading, from the storage apparatus, data written to the specific divided region before the latest update of the mappings, appending the current identification number to the read data, and rewriting, to the storage apparatus, the read data with the current identification number appended thereto.

7. A non-transitory computer-readable storage medium storing a storage control program that causes a computer to execute a process comprising:
identifying, upon request for a data write to a write address included in any of a plurality of divided regions created by dividing logical storage space on a storage apparatus, an identification number associated with a divided region including the write address amongst a plurality of identification numbers each representing a different write frequency based on mapping management information indicating mappings between each of the plurality of divided regions and one of the plurality of identification numbers, appending the identified identification number to a first write request for the write address, and transmitting the first write request with the identified identification number appended thereto to the storage apparatus, measuring a write frequency of each of the plurality of divided regions, updating the mappings indicated by the mapping management information based on results of the measuring, the updating including associating, when the plurality of identification numbers is smaller in number than the plurality of divided regions, at least one of the plurality of identification numbers with two or more of the plurality of divided regions, and identifying, upon request for a data write to the write address after the updating, an identification number associated with the divided region including the write address amongst the plurality of identification numbers based on the mapping management information, appending the identified identification number to a second write request for the write address, and transmitting the second write request with the identified identification number appended thereto to the storage apparatus.

8. The non-transitory computer-readable storage medium according to claim 7, wherein: the plurality of identification numbers is information used to control the storage apparatus to write write data to a different one of a plurality of management regions according to an identification number appended to the write data, and each of the plurality of management regions is a unit of data deletion, included in physical storage space on the storage apparatus.

9. The non-transitory computer-readable storage medium according to claim 7, wherein: the updating is performed each time a cumulative amount of data written to the storage apparatus increases by a predetermined amount.

10. The non-transitory computer-readable storage medium according to claim 7, wherein: the process further includes:

acquiring, when an amount of free space in physical storage space on the storage apparatus has fallen below a predetermined amount, a total data amount of data with each of the plurality of identification numbers appended thereto at time of writing amongst data written to the storage apparatus, identifying, amongst the plurality of identification numbers, a specific identification number whose total data amount exceeds a predetermined reference amount, and causing the storage apparatus to implement garbage collection on data with the specific identification number appended thereto at time of writing.

11. The non-transitory computer-readable storage medium according to claim 10, wherein:

the process further includes:

storing, in a memory, data amount management information which registers a write data amount corresponding to each of the plurality of identification numbers, and adding, each time a write request with one of the plurality of identification numbers appended thereto is transmitted to the storage apparatus, a size of data involved in the write request to the write data amount corresponding to the appended identification number, and the acquiring includes reading, from the data amount management information as the total data amount, the write data amount corresponding to each of the plurality of identification numbers at time of the acquiring.

12. The non-transitory computer-readable storage medium according to claim 10, wherein: the process further includes:

identifying, amongst the plurality of divided regions, a specific divided region which is associated with the specific identification number before a latest update of the mappings and for which no write request has been issued after the latest update of the mappings, identifying, based on the mapping management information, a current identification number currently associated with the specific divided region amongst the plurality of identification numbers, and reading, from the storage apparatus, data written to the specific divided region before the latest update of the mappings, appending the current identification number to the read data, and rewriting, to the storage apparatus, the read data with the current identification number appended thereto.

* * * * *